(12) United States Patent
Nakazawa

(10) Patent No.: US 6,728,487 B2
(45) Date of Patent: Apr. 27, 2004

(54) DRIVE METHOD FOR A PLURALITY OF ACOUSTO-OPTIC FILTERS, ACOUSTO-OPTIC FILTER APPARATUS, AND SELECTIVE WAVELENGTH EXTENSION METHOD

(75) Inventor: Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 09/755,041

(22) Filed: Jan. 8, 2001

(65) Prior Publication Data

US 2001/0008450 A1 Jul. 19, 2001

(30) Foreign Application Priority Data

Jan. 14, 2000 (JP) ........................................ 2000-007038

(51) Int. Cl.[7] .............................. H04J 14/02; H04J 4/00; H04B 10/02; H04B 10/04; G02F 1/33

(52) U.S. Cl. .............................. 398/85; 398/76; 398/82; 398/83; 398/180; 398/201; 359/308; 359/312

(58) Field of Search ............................... 398/79, 82, 83, 398/85, 87, 90, 91, 115, 149, 150, 163, 68, 76, 201, 180; 359/285, 308, 312

(56) References Cited

U.S. PATENT DOCUMENTS

| 5,357,097 A | * | 10/1994 | Shiozawa et al. | ........... 250/205 |
| 5,718,226 A | | 2/1998 | Riza | ...................... 128/660.01 |
| 6,366,379 B1 | * | 4/2002 | Terahara et al. | ............. 398/213 |
| 6,411,411 B1 | * | 6/2002 | Okazaki et al. | ............. 398/207 |
| 6,538,782 B1 | * | 3/2003 | Otsuka et al. | ................. 398/82 |

FOREIGN PATENT DOCUMENTS

| JP | 3071188 | 5/2000 |
| WO | WO 98/04954 | 2/1998 |

OTHER PUBLICATIONS

Patent Abstracts of Japan of JP 11–305179 dated May 5, 1999.

* cited by examiner

*Primary Examiner*—Leslie Pascal
*Assistant Examiner*—Dalzid Singh
(74) *Attorney, Agent, or Firm*—Staas & Halsey LLP

(57) ABSTRACT

An AOTF drive method for driving a plurality of AOTFs connected in tandem comprises: separating a plurality of RF signals in advance into a plurality of groups; batch-branching the RF signals of each group in accordance with the number of steps of the AOTFS; and batch-adjusting the phases of the individual branched RF signals. As a result, this makes it possible to reduce the number of phase shifters compared to the prior art while maintaining the effectiveness of suppressing beats in the AOTFs.

14 Claims, 15 Drawing Sheets

A.

| | k=1 | k=2 |
|---|---|---|
| $\phi k2 - \phi k1$ | 0(degrees) | 180(degrees) |

B.

A.

| | k = 1 | k=2 | k=3 |
|---|---|---|---|
| $\phi k2 - \phi k1$ | 0(degrees) | 120(degrees) | 240(degrees) |
| $\phi k3 - \phi k1$ | 0(degrees) | 240(degrees) | 120(degrees) |

B.

DRIVE METHOD FOR A PLURALITY OF ACOUSTO-OPTIC FILTERS, ACOUSTO-OPTIC FILTER APPARATUS, AND SELECTIVE WAVELENGTH EXTENSION METHOD

BACKGROUND OF THE INVENTION

1. Field of the Invention

The present invention relates to an acousto-optic filter drive method realizing reduction of a drive apparatus in size for suppressing the time-fluctuations of output characteristics of acousto-optic filters. The invention further relates to an acousto-optic filter applied to the acousto-optic filter drive method, an optical add/drop multiplexer, an optical communication system, and a selective wavelength extension method.

Recently, there has been demanded an optical communication system with a super-long distance and a large capacity so as to construct future multi-media networks. For realizing the large capacity, there has been investigated and developed the wavelength-division multiplexing (WDM) system because it has advantages of utilizing the wide band and the large capacity of optical fibers with efficiency.

Especially in recent years, it has been demanded to realize not only the optical communication system for transmitting/receiving the WDM optical signal between two stations but also an optical communication system having the ADM function, in which an optical signal having a specific wavelength of the WDM optical signal is selectively passed through a repeater station called the "node" disposed midway of the optical transmission line and in which the optical signals at other wavelengths are dropped at that node or another optical signal is added from the node and transmitted to another node. In order to realize the ADM function, there have been extensively investigated the acousto-optic filters (AOTF).

2. Description of the Related Art

The AOTF is an optical part for rotating the polarization state of light to propagate through an optical waveguide by inducing a refractive index change due to the acousto-optic effect in the optical waveguide thereby to separate/select the light of a specific wavelength. One example of the AOTF will be described in the following.

In the AOTF, as shown in FIG. 12, optical waveguides 502 and 503 are formed in a substrate 501 made of a piezoelectric crystal. For example, the optical waveguides are formed in the substrate of lithium niobate ($LiNbO_3$) by the titanium (Ti) diffusion method. As shown in FIG. 12, the optical waveguides 502 and 503 are individually equipped at their input terminals and output terminals with a port Pin and a port Pad, and a port Pth and a port Pdr. The optical waveguides 502 and 503 intersect each other at two portions, which are equipped with polarization beam splitters (PBS) 504 and 509.

Between the intersecting portions, an inter digital transducer (IDT) 506 is formed over the optical waveguides 502 and 503. A surface acoustic wave is generated by applying RF signals generated by a signal source 507, to the IDT 506 to change the refractive indices of the optical waveguides 502 and 503.

An input light 1 to be inputted to the port Pin is a mixture of a TE mode and a TM mode. This input light 1 is separated by the PBS 504 into the TE mode light and the TM mode light, of which the TM mode light propagates through the optical waveguide 502 and the TE mode propagates through the optical waveguide 503.

Now, when the surface acoustic wave is generated by applying the RF signal of a predetermined frequency, the refractive indices of the optical waveguides 502 and 503 change. Of the input light 1, therefore, only the light having a wavelength to interact on the change in the refractive index rotates the polarized light state. The rotation is proportional to the working length for the light in each mode to interact on the change in the refractive index and to the power of the RF signal. The working length is adjusted by the interval between absorbers 505 and 508 for absorbing the surface acoustic wave to be generated over the optical waveguides 502 and 503 across the IDT 506.

By optimizing the working length and the power of the RF signal, therefore, the TM mode light is transformed into the TE mode light in the optical waveguide 502, and the TE mode light is transformed into the TM mode light in the optical waveguide 503.

As a result, the mode-changed light is outputted as a selected light to the port Pdr by the PBS 509, whereas the light left unchanged in the mode is outputted as the transmitted light to the port Pth.

Here, the transmitted light outputted from the port Pth is prepared by eliminating only the light of the wavelength corresponding to the frequency of the RF signal from the input light 1 inputted to the port Pin. It is, therefore, possible to assume that the AOTF has a rejection function (i.e., band eliminating function).

On the other hand, an input light 2 inputted to the port Pad is likewise separated by the PBS 504 into the TE mode light and the TM mode light. Of these, the TM mode light propagates through the optical waveguide 503, and the TE mode light propagates through the optical waveguide 502. Now, when the surface acoustic wave is generated by applying the RF signal of a predetermined frequency, only the light of the predetermined wavelength rotates its polarized light state so that the TE mode light is transformed into the TM mode light in the optical waveguide 502 whereas the TM mode light is transformed into the TE mode light in the optical waveguide 503. As a result, the light changed in the mode is outputted to the port Pth on the transmitted light side by the PBS 509, and the light left unchanged in the mode is outputted to the port Pdr on the selected light side.

Here, the selected light outputted from the port Pdr is made by selecting only light at a wavelength corresponding to the frequency of the RF signal from the input light 1 inputted to the port Pin. The transmitted light outputted from the port Pth is made by eliminating only light at a wavelength corresponding to the frequency of the RF signal from the input light 1 inputted to the port Pin and by adding only light at a wavelength corresponding to the frequency of the RF signals, from the input light 2 inputted to the port Pad, to the eliminated wavelength. Therefore, the AOTF can be though to have the optical adding/dropping functions.

Moreover, the AOTF is enabled to change the wavelength of the selected/added/transmitted light by changing the frequency of the RF signal so that it functions as a tunable filter.

When lights at a plurality of wavelengths are to be selected/dropped by the AOTF, on the other hand, a plurality of RF signals having different frequencies are applied to the IDT 506 of the AOTF. Therefore, beats are necessarily generated in the surface acoustic waves by the plurality of RF signals so that the center wavelength of the lights to be selected/dropped fluctuates with time in accordance with the beats. As a result, the optical power at the target wavelength to be selected/dropped will fluctuate with time although the power of the input lights and the power of the RF signals are constant.

Simulations have been performed on the case in which lights at four wavelengths are to be selected by two AOTFs, for example.

These two AOTFs are connected in tandem by connecting the portion Pdr of the AOTF at the front step with the port Pin of the AOTF at the back step. The RF signal for selecting a channel 1 and the RF signal for selecting a channel 3 are applied to the AOTF at the front step. The RF signal for selecting a channel 2 and the RF signal for selecting a channel 4 are applied to the AOTF at the back step. With this construction, the simulations have been made by setting the wavelengths of the four waves to be selected to 1545.6 nm, 1547.2 nm, 1548.8 nm and 1550.4 nm and by setting the working length of the AOTFs to 43.1 mm.

The results are illustrated in FIG. 13. In FIG. 13, the ordinate indicates a transmittance at the unit of dB, and the abscissa indicates a wavelength at the unit of nm.

As seen from FIG. 13, the first side lobe on the shorter wavelength side than 1545.6 nm and the first side lobe on the longer wavelength side than 1550.4 nm are at about −10 dB because of the beats. These side lobes cause noises so that the selecting characteristics are the better for the lower side lobes.

In Japanese Unexamined Patent Application Publication No. 10-038908, there is described a drive method for improving the time-fluctuations by driving a plurality of AOTFs connected in tandem such that the phases of the beats of a plurality of RF signals by one AOTF may be different between a plurality of AOTFs.

Here will be described a construction for selecting optical signals of two waves, in which such AOTFs are connected in tandem of two steps.

In FIG. 14, a first AOTF 515-1 and a second AOTF 515-2 of the construction shown in FIG. 12 are connected in tandem by connecting the port Pdr, from which the selected light of the first AOTF 515-1 is outputted, with the port Pin of the second AOTF 515-2.

A RF signal f1 of a frequency f1 to oscillate at a signal source 511-1 is inputted to phase shifters 512-1 and 512-2 for adjusting the phases. The RF signal f1 inputted to the phase shifter 512-1 is adjusted to a phase Ø11 and then inputted to a multiplexer 513-1, and the RF signal f1 inputted to the phase shifter 512-2 is adjusted to a phase Ø12 and then inputted to a multiplexer 513-2.

Likewise, an RF signal f3 of a frequency f3 to oscillate at a signal source 511-3 is inputted to phase shifters 512-5 and 512-6 for adjusting the phases. The RF signal f3 inputted to the phase shifter 512-5 is adjusted to a phase Ø11 and then inputted to the multiplexer 513-1, and the RF signal f3 inputted to the phase shifter 512-6 is adjusted to a phase Ø12 and then inputted to the multiplexer 513-2.

Moreover, an RF signal f2 of a frequency f2 to oscillate at a signal source 511-2 is inputted to phase shifters 512-3 and 512-4 for adjusting the phases. The RF signal f2 inputted to the phase shifter 512-3 is adjusted to a phase Ø21 and then inputted to the multiplexer 513-1, and the RF signal f2 inputted to the phase shifter 512-4 is adjusted to a phase Ø22 and then inputted to the multiplexer 513-2.

Likewise, an RF signal f4 of a frequency f4 to oscillate at a signal source 511-4 is inputted to phase shifters 512-7 and 512-8 for adjusting the phases. The RF signal f4 inputted to the phase shifter 512-7 is adjusted to a phase Ø21 and then inputted to the multiplexer 513-1, and the RF signal f4 inputted to the phase shifter 512-8 is adjusted to a phase Ø22 and then inputted to the multiplexer 513-2.

The RF signals f1 and f2 combined in the multiplexer 513-1, are applied to the IDT in the first AOTF 515-1. The RF signals f1 and f2 combined in the multiplexer 513-2, are applied to the IDT in the second AOTF 515-2.

Here, the phase differences are adjusted to |Ø11−Ø12|=0 degrees and |Ø21−Ø22|=180 degrees by the individual phase shifters 515-1 and 515-2. Then, positions where the selected lights are most attenuated are deviated with time in the individual AOTFs so that the optical power of the selected light 2 can be suppressed in the time-fluctuations when the power of the input light and the power of the RF signals are constant.

Here, the construction of the AOTFs should not be limited to that shown in FIG. 12 but can be modified to that shown in FIG. 15, for example.

In the AOTF, as shown in FIG. 15, optical waveguides 602 and 603 are formed in a piezoelectric crystal substrate 601. These optical waveguides 602 and 603 intersect each other at two portions, at which PBSs 604 and 609 are disposed. Between these two intersecting portions, A SAW guide 310 of a metal film is so formed over the two optical waveguides 602 and 603 as to intersect the two optical waveguides 602 and 603 individually. To the SAW guide 310, there are propagated the surface acoustic waves which are generated by applying the RF signals generated in a signal source 607 to an IDT 606. This IDT 606 is formed over the substrate 601 on the extension in the longitudinal direction of the SAW guide 310. Absorbers 605 and 608 for absorbing the surface acoustic waves are so formed over the substrate 601 as to interpose the SAW guide 310 and the IDT 606.

The operations and effects of this AOTF are similar to those of the AOTF shown in FIG. 12, and their description will be omitted.

Here in the AOTF thus constructed, the number of phase shifters increases according to the number of signal sources and the step number of the tandem connection of the AOTFs. In the AOTFs connected in tandem of three steps in which an input light is a WDM optical signal of thirty two waves so that the thirty two waves can be arbitrarily selected, for example, 32×3=96 phase shifters are required to obstruct the reductions in the size and cost for the apparatus in the entire AOTF.

SUMMARY OF THE INVENTION

An object of the invention is to provide an AOTF drive method and an AOTF capable of reduce the number of phase shifters than that of the prior art.

Another object of the invention is to provide a selective wavelength extension method for extending a wavelength to be selected by the AOTF without increasing the number of phase shifters.

Still another object of the invention is to provide an optical add/drop multiplexer where such AOTF is applied.

A further object of the invention is to provide an optical communication system where the optical add/drop multiplexer equipped with the AOTF is applied.

The aforementioned objects are achieved by an AOTF drive method comprising steps of: separating a plurality of RF signals in advance into a plurality of groups; batch-branching the RF signals of each group in accordance with the number of steps of AOTFs; and batch-adjusting the phases of the individual branched RF signals.

The aforementioned objects are also achieved by an AOTF apparatus comprising: a plurality of AOTFS; a plurality of signal generating parts for generating RF signals; a combining part for separating the RF signals generated in the signal generating parts into a plurality of groups and combining the RF signals in each of part; a branching part for respectively supplying outputs of the combining parts to an acousto-optic filters; and a phase adjusting part for adjusting the phases of the outputs of the combining parts so that the phases of beats generated in the plurality of AOTFs are made different.

Moreover, the aforementioned objects are achieved by a selective wavelength extension method for including an RF signal to be extended corresponding to a light to be extended in any of the existing groups even when the number of wavelengths to be selected by the AOTF is extended.

Moreover, the aforementioned objects are achieved by an optical add/drop multiplexer and an optical communication system which comprises such AOTF.

Thus, the number of phase shifters can be substantially reduced than in the case where the RF signals are branched into the number of steps of AOTFs to adjust the phases of the individual branched RF signals. In the AOTF and the optical add/drop multiplexer, therefore, it is possible to simplify the structure of the apparatus and to reduce the number, size, power consumption, and cost of the components.

In the selective wavelength extension method, moreover, the number of wavelengths to be selected by the AOTF can be extended with simplicity and promptness.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the invention will be described with reference to the accompanying drawings.
(First Embodiment)

The first embodiment is directed to the AOTF according to the invention.

Figure 1:
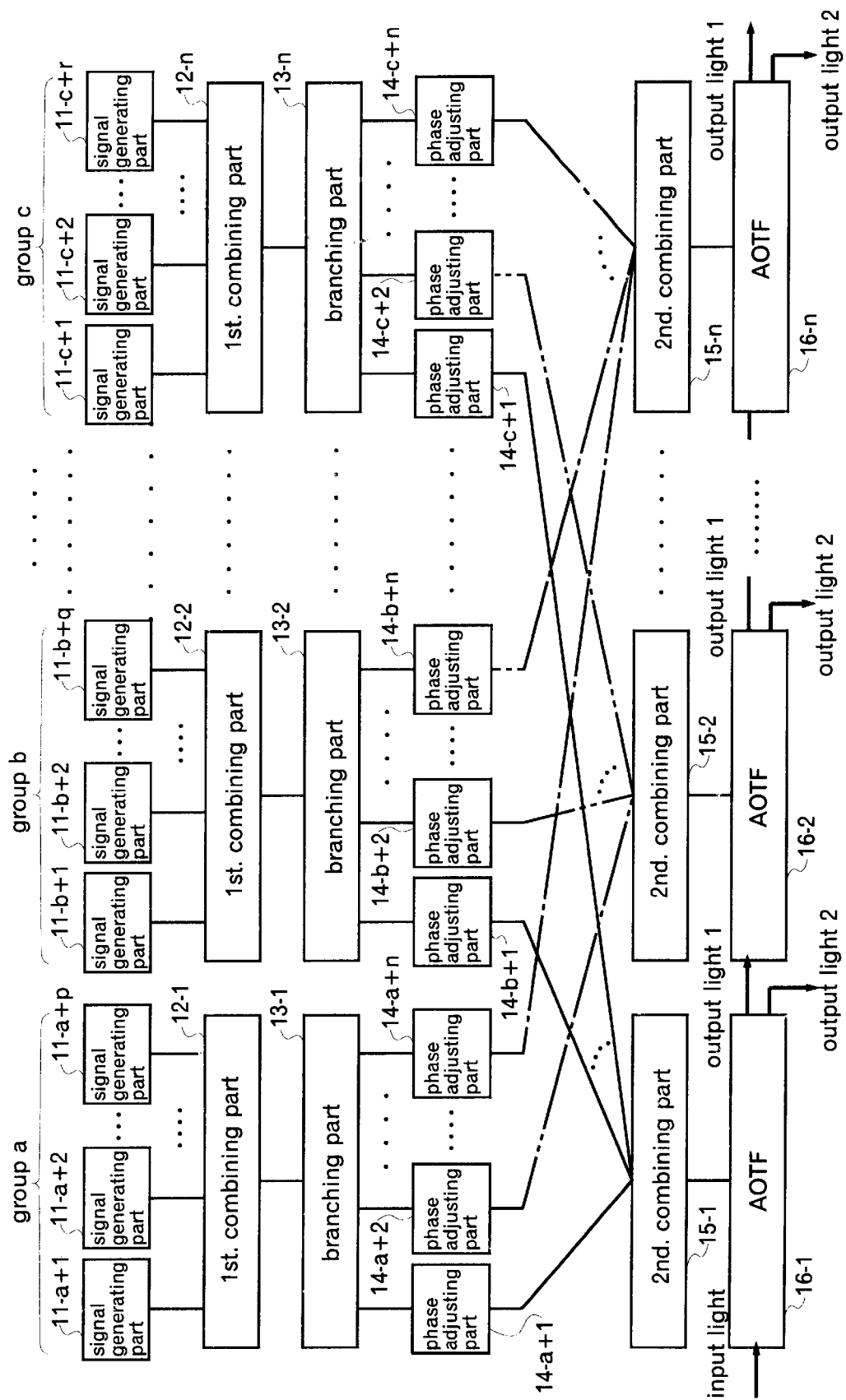
FIG. 1 is a diagram showing a construction of a first embodiment.

In FIG. 1, the present embodiment is constructed to include: a plurality of AOTFs 16 connected in tandem for selectively outputting light at a wavelength corresponding to an RF signal; a plurality of signal generating parts 11 for generating RF signals; a combining part 12 for separating the RF signals of different frequencies, as generated by the signal generating parts 11, into a plurality of groups and for combining the RF signals in each group to generate combined RF signals; a branching part 13 for branching the combined RF signals in each group so to be respectively supplied to the plurality of AOTFs 16; and a phase adjusting part 14 for adjusting the phase of the combined RF signals in each group so that the phases of the beats of the plurality of RF signals generated in the plurality of AOTFs 16 are made different.

Thus, a drive method for connecting the plurality of AOTFs 16 for selectively outputting lights at wavelengths corresponding to the RF signals, in tandem of steps comprises: the first step of branching the plurality of RF signals of different frequencies into the groups; the next step of combining the RF signals in each group to generate the combined RF signals; the next step of branching the combined RF signals in each group so to be supplied to the plurality of AOTFs 16; and the next step of making the phases of the beats of the plurality of RF signals generated in the AOTFs 16, different.

In order to prevent the power of the light selectively outputted from the AOTFS, from fluctuating with the time, the RF signals are separated into the step number of the AOTFs, as described in the [Related Art] column, so that the phases of the beats generated by the plurality of RF signals for one AOTF are made different between the plurality of AOTFs. The RF signals thus branched are applied, after adjusted in phase, to the plurality of AOTFs.

In these AOTFs, some of the plurality of branched RF signals are likewise adjusted in phase. Therefore, the RF signals thus adjusted in phase are grouped into one in advance and are branched in a batch according to the step number of the AOTFs so that these branched RF signals are batch-adjusted in phase. As a result, the number of phase adjusting parts 14 can be made far smaller than that of the case in which the branched RF signals according to the step number of the AOTFs are individually adjusted in phase.

When the AOTFs connected in tandem of three steps can selectively output lights at forty four different wavelengths, the phase adjusting parts required are 44×3=132, when the RF signals are individually branched and adjusted in phase, but are sufficed by 3×3=9 in the invention.

Therefore, such AOTFs can simplify the structure of the system and reduce the number, size, power consumption and price of the components.

Here in the AOTFs, it is preferable that the individual phases of the combined RF signals branched in the phase adjusting part 14 are adjusted so that the phase difference of the beats between the plurality of AOTFs 16 have a value which is obtained by dividing 180 degrees by the step number of the plurality of AOTFs 16.

In these AOTFs, on the other hand, the separating in the first combining part 12 is preferably performed by numbering the RF signals in order of frequencies and subsequently by separating the RF signals into groups according to remainders which result from dividing the numbers by the step number of the plurality of AOTFs 16.

In order to supply these AOTFs individually, moreover, there is provided a second combining part 15 for individually collecting and combining the combined RF signals adjusted in phase by the phase adjusting part 14. It is preferred that the second combining part 15 adjusts the powers of the combined RF signals collected one by one and combines the adjusted RF signals.

With this construction, the collected RF signals are combined after equalized in power, so that the powers of the lights at the individual wavelengths outputted from the AOTF, can be equalized.

On the other hand, an optical add/drop multiplexer for adding/dropping optical signals to/from WDM optical signal to be transmitted on an optical transmission line may be constructed to include: the AOTF; an optical receiving apparatus for receiving/processing the optical signal dropped by the AOTF; and an optical sending apparatus for generating an optical signal added at the AOTF.

Alternatively, the optical add/drop multiplexer may be constructed to include: an optical branching part for branching the WDM optical signal into two; an optical receiving part connected with one branched by the optical branching part, for receiving/processing the optical signals branched from the WDM signal by the optical add/drop multiplexer; the aforementioned AOTF connected with the other branched by the optical branching part, for rejecting the optical signal to be received/processed in the optical receiving part, from the WDM signal; an optical sending part for generating an optical signal to be added at the optical add/drop multiplexer; and an optical multiplex part for wavelength-multiplexing the WDM optical signal from the AOTF and the optical signal outputted from the optical sending part.

Moreover, this optical add/drop multiplexer may be additionally included in an optical communication system which includes: an optical sending apparatus for generating the WDM optical signal for wavelength-multiplexing a plurality of optical signals; an optical transmission line for transmitting the WDM optical signal outputted from the optical sending apparatus; and an optical receiving part for receiving/processing the WDM optical signal outputted from the optical transmission line.

Here will be described the case in which the wavelength to be selected is extended.

In the selected wavelength extension method for extending the number of wavelengths selected by the AOTF, the RF signal corresponding to the selected wavelength to be extended is so made to belong to any of the group as to keep the phase of the beat occurring at one AOTF.

Here, the selected wavelength extension method is preferred to include: a first step of extending the wavelength to have a number which is one smaller than the minimum of the numbers given to the RF signals in order of frequencies; and a second step of causing the RF signal corresponding to the extended wavelength to be included in any of the groups in accordance with remainders which result from dividing the number one smaller than the minimum by the step number of the plurality of AOTFs.

On the other hand, the selected wavelength extension method is preferred to include: a first step of extending the wavelength to have a number which is one larger than the maximum of the numbers given to the RF signals in order of frequencies; and a second step of causing the RF signal corresponding to the extended wavelength to belong to any of the groups in accordance with remainders which result from dividing the number one larger than the maximum by the step number of the plurality of AOTFs.

According to these extension methods, the RF signal to be extended according to a wavelength to be extended is included in any of the existing groups so that the phase adjusting part need not be newly extended.

(Construction of Second Embodiment)

A second embodiment relates to an optical communication system according to the invention.

Figure 2:
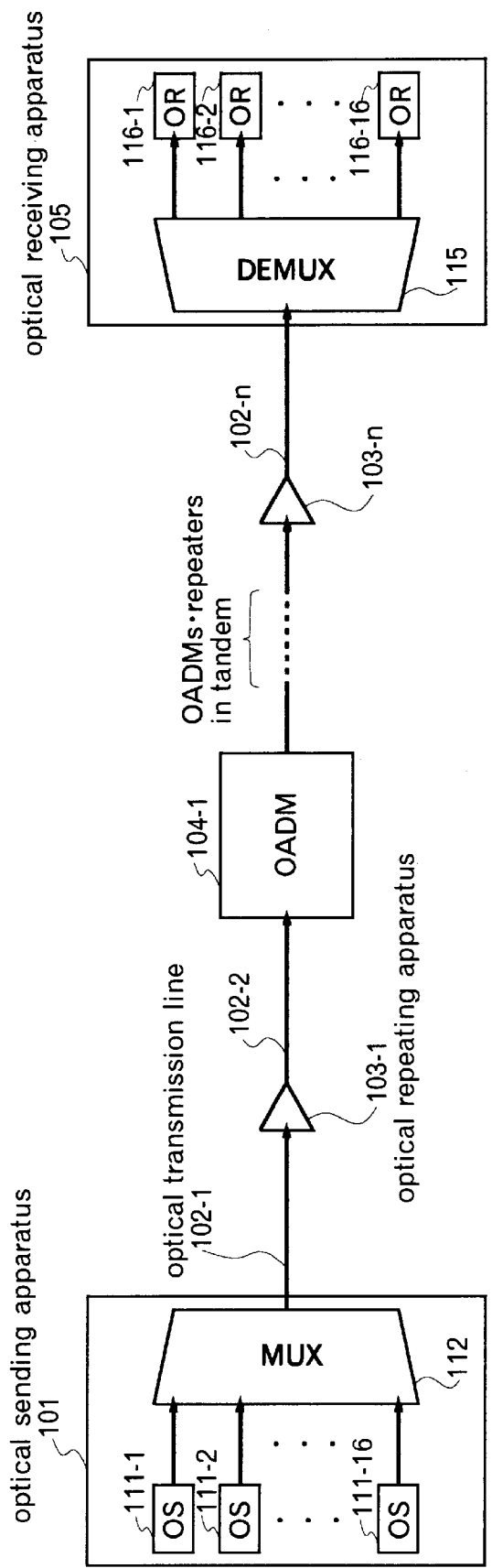
FIG. 2 is a diagram showing a construction of an optical communication system in a second embodiment.

In FIG. 2, the optical communication system is constructed to include: an optical sending apparatus 101 for generating a sixteen-WDM optical signal; an optical transmission line 102 for transmitting the WDM optical signal outputted from the optical sending apparatus 101; an optical add/drop multiplexer 104 for adding/dropping an optical signal to/from the WDM optical signal to be transmitted on the optical transmission line 102; and an optical receiving apparatus 105 for receiving/processing the WDM optical signal transmitted. With the optical communication system, moreover, an optical repeating apparatus 103 which is interposed between the optical transmission lines 102 for compensating the transmission loss of the optical transmission lines 102. Here, the optical add/drop multiplexer 104 and the optical repeating apparatus 103 should not be limited to the case in which each of them is connected between the optical transmission lines 102, but may be provided in plurality, if necessary.

The optical sending apparatus 101 is constructed, for example, to include: a plurality of optical senders (OS) 111-1 to 111-16 for generating optical signals corresponding to the individual channels of the WDM optical signal; and an optical multiplexer (MUX) 112 for wavelength-multiplexing the optical signals outputted from the OS 111-1 to 111-16. The number of these OS 111 accords to the number of channels of the WDM optical signal and is exemplified by 16 in the present embodiment. The number of optical receivers 116, as will be described hereinafter, is likewise.

The OS 111 can be constructed, for example, to include: a semiconductor laser for oscillating a laser beam with a predetermined wavelength; and an external modulator such as a Mach-Zehnder interferometer type optical modulator for modulating the laser beam inputted with information to be sent. The MUX 112 can utilize a dielectric multilayer optical filter, i.e., one of interference filter or an arrayed waveguide grating optical multi/demultiplexer.

The optical transmission line 102 is made of optical fibers by making use of various optical fibers such as single mode fibers of zero dispersion of the band of 1.3 microns or dispersion-shifted optical fibers of the band of 1.5 microns.

The construction of the optical add/drop multiplexer 104 will be described hereinafter.

The optical receiving apparatus 105 is constructed, for example, to include an optical demultiplexer (DEMUX) 115 and optical receivers (OR) 116-1 to 116-16. The WDM optical signal, as inputted from the optical transmission line 102 to the optical receiving apparatus 105, are wavelength-demultiplexed for each corresponding to each channel by the DEMUX 115. The divided optical signals of the individual channels are inputted to and received/processed by the ORs 116-1 to 116-16 each comprised of a photodiode and a demodulator.

The optical amplifying apparatus 103 is constructed, for example, to include an erbium-doped fiber amplifier composed of erbium-doped fibers and a pump source. The erbium-doped fibers form a population inversion, when supplied with an energy from the pump source, and effects a stimulated emission to amplify the WDM optical signal inputted. Here, the optical amplifying apparatus 103 has its gain-bandwidth determined to conform to the bandwidth of the WDM optical signal. The gain-bandwidth is dependent on the kind of a rare earth element to be doped to the optical fibers and on the excitation wavelength of the pump source. For example, the erbium-doped fiber amplifier having an excitation wavelength of 1.48 microns or 0.98 microns can amplify the band of 1.55 microns.

Here will be described the construction of the optical add/drop multiplexer 104.

The optical add/drop multiplexer 104 is constructed of two steps of AOTF by shifting the phase of the beat of the surface acoustic wave generated at each AOTF, by 90 degrees. This construction realizes suppression of the time fluctuations of the power of the transmitted optical signal, the power of the added optical signal and the power of the dropped optical signal.

Figure 3:
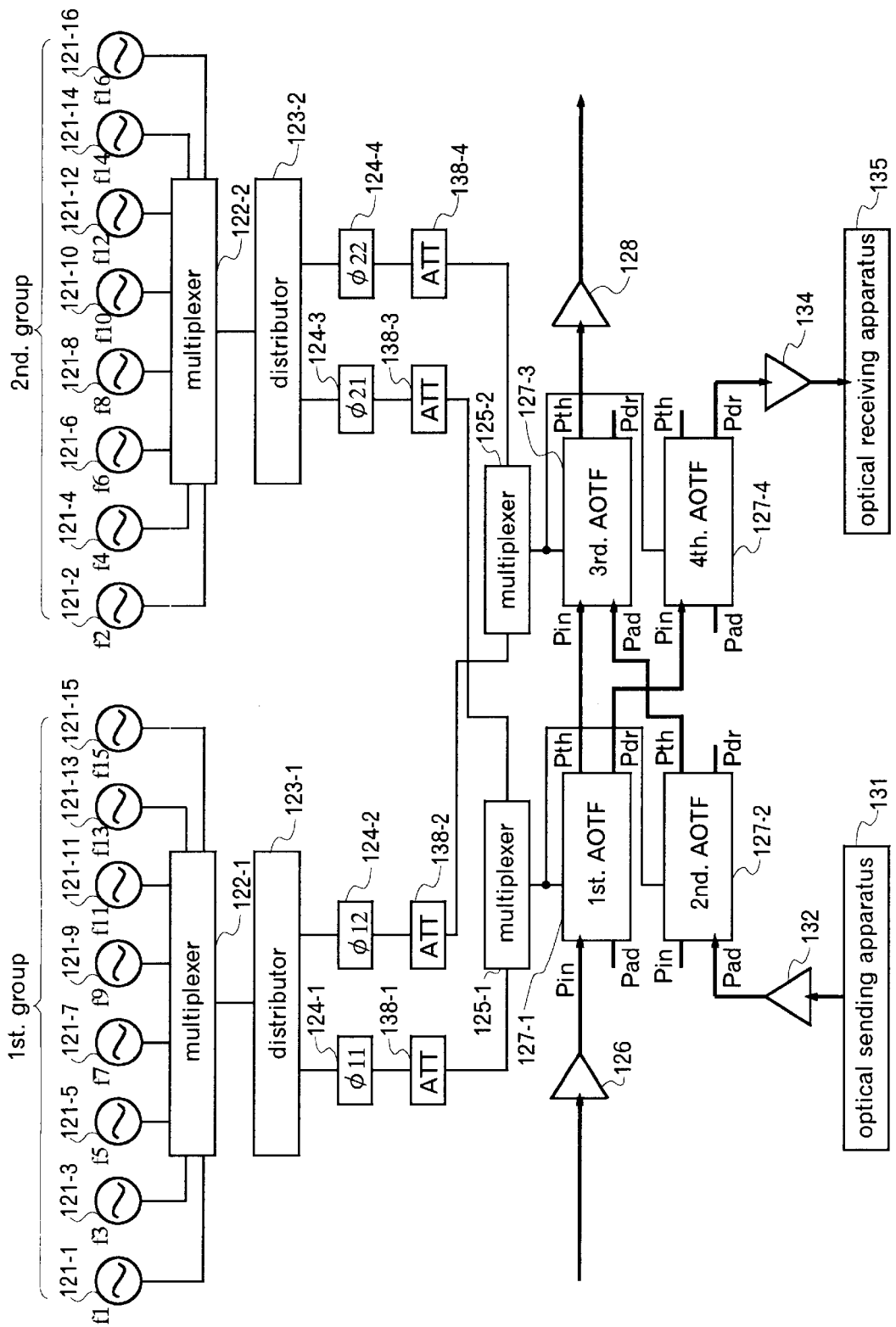
FIG. 3 is a diagram showing a construction of an optical add/drop multiplexer in the optical communication system of the second embodiment.

In FIG. 3, the RF signals for driving first to fourth AOTFs 127-1 to 127-4 are generated by an oscillators 121 and separated into two groups because the AOTFs are connected in tandem of two steps.

The number of the oscillators 121 accords to the number of channels to be dropped/added by the optical add/drop multiplexer 104 and is prepared by sixteen because sixteen channels are dropped/added in this embodiment. The oscillatory frequencies f1 to f16 of the individual oscillators 121-1 to 121-16 are so individually set that the polarized light states of the optical signals corresponding to the individual channels in the WDM optical signal may be rotated by the first to fourth AOTFs 127-1 to 127-4. For example, the oscillator 121-1 is set to the frequency f1 to rotate the polarized light state of the optical signal of the channel 1 by the first to fourth AOTFs 127-1 to 127-4, and the oscillator 121-2 is set to the frequency f2 to rotate the polarized light state of the optical signal of the channel 2 by the first to fourth AOTFs 127-1 to 127-4.

More specifically, when the optical signal of the channel 1 is set to the wavelength of 1.5468 microns, the oscillatory frequency f1 of the oscillator 121-1 is set to 176.978 MHz. When the optical signal of the channel 2 is set to the wavelength of 1.5464 microns, the oscillatory frequency f2 of the oscillator 121-2 is set to 176.795 MHz. Here, the relation between the frequency for driving the AOTF and the wavelength of the light, at which the polarized light state is rotated with that frequency, can be expressed substantially by a linear function.

The oscillatory frequencies f1 to f16 are separated, when they are numbered by arranging them sequentially from the largest frequency f1 to the smaller ones, that the frequencies of odd numbers f1, f3, - - - , f13 and f15 may belong to the first group whereas the frequencies of even numbers f2, f4, - - - , f14 and f16 may belong to the second group.

Figure 4:
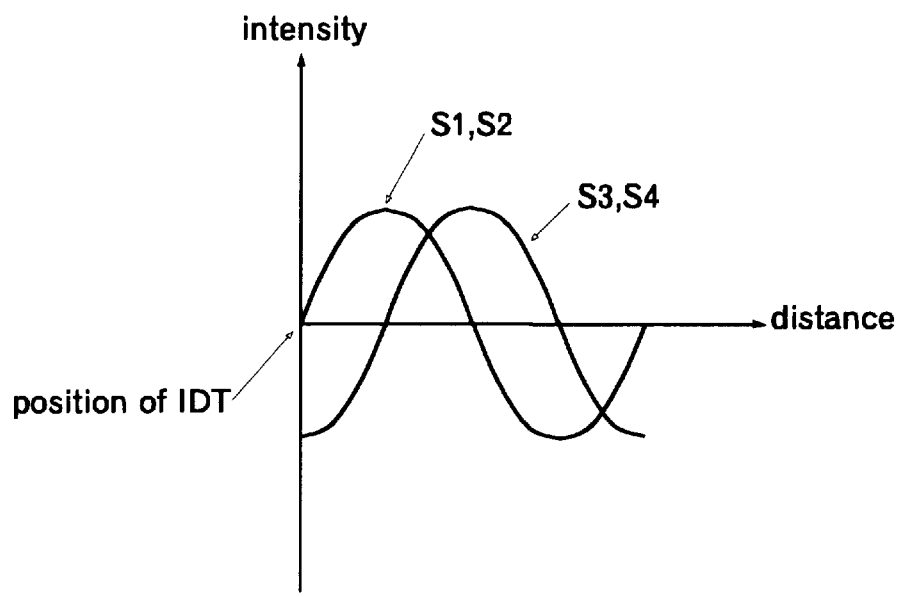
FIG. 4A is a diagram tabulating the phase Ø of each phase shifter in the second embodiment.
FIG. 4B is a diagram illustrating an intensity distribution of a beat in a surface acoustic wave for a time period in each AOTF of the second embodiment.

The individual RF signals of the frequencies included in the first group are inputted to a multiplexer 122-1 for combining them. The combined RF signal is inputted to a distributor 123-1. This distributor 123-1 branches the combined RF signal into two. Therefore, the individual combined RF signals thus branched contain an identical frequency component. One of the combined RF signals branched is inputted to a phase shifter 124-1 for adjusting the phase of the input signal to Ø11. The other of the combined RF signals branched is inputted to a phase shift 124-2 for adjusting the phase of the input signal to Ø12. As shown in FIG. 4A, the phase shifters 124-1 and 124-2 adjust the phases of the individual combined RF signals to Ø12−Ø11=0 degrees.

The combined RF signal outputted from the phase shifter 124-1, is adjusted in power by an attenuator (ATT) 138-1 and is then inputted to a multiplexer 125-1. The combined RF signal outputted from the phase shifter 124-2, is adjusted in power by an attenuator (ATT) 138-2 and is then inputted to a multiplexer 125-2.

On the other hand, the individual RF signals of the frequencies belonging to the second group are inputted to a multiplexer 122-2, and the combined RF signal is inputted to a distributor 123-2. The distributor 123-2 branches the combined RF signal into two. One of the combined RF signals branched is inputted to a phase shifter 124-3 for adjusting the phase of the input signal to Ø21. The other of the combined RF signals branched is inputted to a phase shift 124-4 for adjusting the phase of the input signal to Ø22. As shown in FIG. 4A, the phase shifters 124-3 and 124-4 adjust the phases of the individual combined RF signals to Ø22−Ø21=180 degrees. Here, the phases of the individual combined RF signals may be adjusted to Ø22−Ø21=−180 degrees.

The combined RF signal outputted from the phase shifter 124-3, is adjusted in power by an ATT 138-3 and is then inputted to the multiplexer 125-1. The combined RF signal outputted from the phase shifter 124-4, is adjusted in power by an ATT 138-4 and is then inputted to the multiplexer 125-2.

The attenuations of the ATTs 138-1 to 138-4 are so set that the combined RF signal powers outputted from the individual ATTs 138-1 to 138-4 become equal to one another.

Here, it is set according to the channel to be dropped/added by the optical add/drop multiplexer 104 which one of the individual RF signals of the frequencies belonging to the first group is to be inputted to the multiplexer 122-1 and which one of the individual RF signals of the frequencies belonging to the second group is to be inputted to the multiplexer 122-2. When the first to sixth channels are to be dropped/added in the optical add/drop multiplexer 104, for example, the individual RF signals of the frequencies f1, f3 and f5 belonging to the first group are inputted to the multiplexer 122-1, and the individual RF signals of the frequencies f2, f4 and f6 belonging to the second group are inputted to the multiplexer 122-2. The ON/OFF of the RF signals to be inputted to the multiplexers 122-1 and 122-2 can be realized either by turning ON/OFF the individual oscillators 121-1 to 121-16 or by connecting switches between the individual oscillators 121-1 to 121-16 and the multiplexers 122-1 and 122-2 to turn ON/OFF the switches.

The multiplexer 125-1 combines the individual combined RF signals inputted. These combined RF signals are applied to the IDT in the first AOTF 127-1 and the IDT in the second AOTF 127-2 to generate the surface acoustic waves in the individual AOTFs 127-1 and 127-2.

The multiplexer 125-2 combines the individual combined RF signals inputted. These combined RF signals are applied to the IDT in the third AOTF 127-3 and the IDT in the fourth AOTF 127-4 to generate the surface acoustic waves in the individual AOTFs 127-3 and 127-4.

Figure 12:
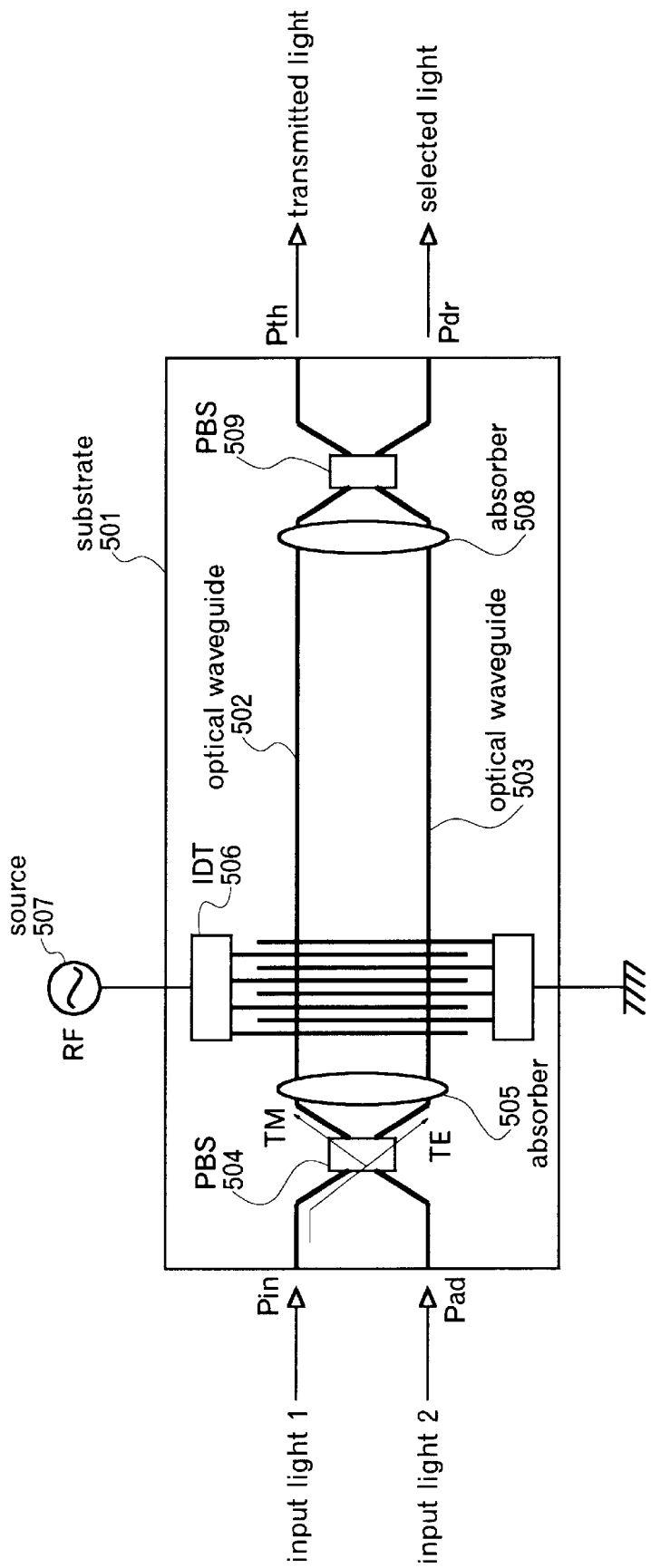
FIG. 12 is a diagram showing a construction of one example of the AOTF.

The first to fourth AOTFs 127-1 to 127-4 are similar to the AOTFs shown in FIG. 12, and the description of their construction will be omitted.

The WDM optical signal transmitted from the optical repeating apparatus 103 or the optical add/drop multiplexer 104 through the optical transmission line 102, is inputted to an optical amplifier 126 in the optical add/drop multiplexer 104. The optical amplifier 126 is a preamplifier for compensating the transmission loss, which has occurred on the optical transmission line 102, and employs a rare earth element doped optical fiber amplifier, for example.

The WDM optical signal amplified by the optical amplifier 126 is inputted to a port Pin of the first AOTF 127-1. of the WDM optical signal inputted, only the optical signal corresponding to the frequency contained in the combined RF signals of the first and second groups from the multiplexer 125-1 is rotated in the polarized light state and is outputted to a port Pdr. Moreover, the remaining optical signals are outputted to a port Pth. In the example thus far described, the optical signals of the first to sixth channels are outputted to the port Pdr, and the optical signals of the seventh to sixteenth channels are outputted to the port Pth.

The optical signal outputted from the port Pdr of the first AOTF 127-1 is inputted to the port Pin of the fourth AOTF 127-4. This input signal is rotated in its polarized light state in the fourth AOTF 127-4 with the RF signals of the first and second groups from the multiplexer 125-2 and is outputted to the port Pdr.

At this time, the RF signal belonging to the second group, as applied to the fourth AOTF 127-4 by the multiplexer 125-2, has a phase which is shifted by 180 degrees from the phase of the RF signal belonging to the second group, as applied to the first AOTF 127-1. Even if the outputs in a slightly attenuated state and in an absolute unattenuated state with respect to the optical signals, as rotated in the polarized light state by the beat of the surface acoustic wave generated in the first AOTF 127-1 and outputted from the port Pdr of the first AOTF 127-1, are inputted to the port Pin of the fourth AOTF 127-4, therefore, the attenuation timing shifts at the fourth AOTF 127-4 so that the optical signal to be outputted from the port Pdr of the fourth AOTF 127-4 can have outputs of a substantially constant power with time. In the aforementioned example, even if the outputs are made in the slightly attenuated state and in the absolutely unattenuated state with respect to the first to sixth channels outputted from the port Pdr of the first AOTF 127-1, the optical signals of the first to sixth channels to be outputted from the port Pdr of the fourth AOTF 127-4 can have outputs of a substantially constant power with time.

The optical signal, as outputted from the port Pdr of the fourth AOTF 127-4, is inputted as a drop optical signal in the optical add/drop multiplexer 104 to an optical amplifier 134 or a preamplifier. The amplified drop optical signal is inputted to an optical receiving apparatus 135. This optical receiving apparatus 135 is constructed, for example, to include a DEMUX and an OR provided for each channel. The dropped optical signal is divided in wavelength for each channel by the DEMUX, and each wavelength-divided channel is received/processed by the OR corresponding to the channel. In the example thus far described, the dropped light signals of the first to sixth channels are received/processed by the optical receiving apparatus 135.

The added optical signal to be added in the optical add/drop multiplexer 104 is generated in an optical sending apparatus 131 and is inputted through an optical amplifier 132 to a port Pad of the second AOTF 127-2.

The optical sending apparatus 131 is constructed, for example, to include an OS provided for each channel and a MUX. The optical signal to be added is generated in the OS and is then wavelength-multiplexed in the MUX so that it is outputted as the added optical signal from the optical sending apparatus 131. In the example thus far described, the dropped light signals of the first to sixth channels are generated in the optical sending apparatus 131.

The added optical signal, as inputted to the port Pad of the second AOTF 127-2, is rotated in the polarized light state by the second AOTF 127-2 with the RF signals of the first and second groups from the multiplexer 125-1 and is outputted to the port Pth so that it is inputted to the port Pad of the third AOTF 127-3. The added optical signal thus inputted is rotated in the polarized light state by the third AOTF 127-3 with the RF signals of the first and second groups from the multiplexer 125-2 so that it is outputted to the port Pth.

At this time, the RF signal belonging to the second group, as applied to the third AOTF 127-3 by the multiplexer 125-2, has a phase which is shifted by 180 degrees from the phase of the RF signal belonging to the second group, as applied to the second AOTF 127-2. Even if the outputs in a slightly attenuated state and in an absolutely unattenuated state with respect to the optical signals, as rotated in the polarized light state by the beat of the surface acoustic wave generated in the second AOTF 127-2 and outputted from the port Pth of the second AOTF 127-2, are inputted to the port Pad of the third AOTF 127-3, therefore, the attenuation timing shifts at the third AOTF 127-3 so that the optical signal to be outputted from the port Pth of the third AOTF 127-3 can have outputs of a substantially constant power with time.

On the other hand, the optical signal outputted from the port Pth of the first AOTF 127-1 is inputted to the port Pin of the third AOTF 127-3. Of the optical signals inputted, only the optical signal corresponding to the frequency contained in the combined RF signals of the first and second groups from the multiplexer 125-2 is rotated in its polarized light state and is outputted to the port Pdr of the third AOTF 127-3, whereas the remaining optical signals are outputted to the port Pth.

At this time, the RF signal belonging to the second group, as applied to the third AOTF 127-3 by the multiplexer 125-2, has a phase which is shifted by 180 degrees from the phase of the RF signal belonging to the second group, as applied to the first AOTF 127-1. Even if the outputs in a sufficiently rejected state and in a sufficiently unrejected state with respect to the optical signals, as rotated in the polarized light state by the beat of the surface acoustic wave generated in the first AOTF 127-1 and outputted from the port Pdr so that they are rejected from the WDM optical signal, are outputted from the port Pth of the first AOTF 127-1 and inputted to the port Pin of the third AOTF 127-3, therefore, the rejection timing shifts at the third AOTF 127-3 so that the WDM optical signal, from which the optical signal to be outputted to the port Pdr of the first AOTF 127-1 is sufficiently rejected, are outputted from the port Pth of the third AOTF 127-3. Moreover, the attenuation (or the rejection level) of the optical signals to be rejected is substantially constant with time.

Thus, the optical signal inputted to the port Pin of the third AOTF 127-3 and the added optical signal inputted to the port Pad are outputted from the port Pth of the third AOTF 127-3. To the optical signal inputted to the port Pin of the third AOTF 127-3, there is added at the third AOTF 127-3 the added optical signal which is inputted to the port Pad, so that it is outputted as a new WDM optical signal from the port Pth.

The WDM optical signal thus outputted is amplified by an optical amplifier 128 or a post amplifier and is sent to the optical transmission line 102.

In the first to fourth AOTFs 127-1 to 127-4 thus constructed: the two-step construction for the transmitted optical signals corresponds to the two-step construction of the first AOTF 127-1 and the third AOTF 127-3; the two-step construction for the dropped optical signals corresponds to the two-step construction of the first AOTF 127-1 and the fourth AOTF 127-4; and the two-step construction for the added optical signals corresponds to the two-step construction of the second AOTF 127-2 and the third AOTF 127-3.

(Operations/Effects of Second Embodiment)

Each RF signal is branched into two to be respectively applied to the AOTFs connected in tandem of two steps and the individual phases of the branched RF signals are adjusted so as to suppress fluctuations in the power of light selectively outputted from the AOTF due to application of the RF signals having different frequencies to one AOTF.

In the AOTFs connected in tandem of two steps in the second embodiment, the individual RF signals are separated into signals having common phases to be branched and adjusted. Specifically, the individual RF signals are separated into a first group of the RF signals having a phase difference of $\emptyset 12-\emptyset 11=0$ degrees, and a second group of the RF signals having a phase difference of $\emptyset 22-\emptyset 21=180$ degrees.

The RF signals belonging to the first group are combined into one and batch-adjusted in the phase shifters 124-1 and 124-2 to have a phase of $\emptyset 12-\emptyset 11=0$ degrees. The RF signals belonging to the second group are combined into one and batch-adjusted in the phase shifters 124-3 and 124-4 to have a phase of $\emptyset 22-\emptyset 21=180$ degrees.

As a result, the number of phase shifters can be further reduced than that of the case in which the phases are adjusted after each RF signal was branched into two. More specifically, $16 \times 2 = 32$ phase shifters are necessary when they are provided individually for the RF signals, whereas $2 \times 2 = 4$ phase shifters are sufficient in the case of the second embodiment.

Moreover, the individual RF signals to be applied to the first to fourth AOTFs 127-1 to 127-4 are identical between the case when the phase shifters are provided individually for the RF signals and the case of the second embodiment. In the surface acoustic waves, therefore, beats S3 and S4 are so generated in the AOTFs 127-3 and 127-4 of the back step as to eliminate beats S1 and S2 of the AOTFs 127-1 and 127-2 of the front step, as illustrated in FIG. 4B. As a result, the transmitted optical signals, the added optical signals and the dropped optical signals in the first to fourth AOTFs 127-1 to 127-4 are suppressed in their powers from the time-fluctuations. Here, both the phase difference between the beats S1 and S3 and the phase difference between the beats S2 and S4 are at 90 degrees. Here in FIG. 4B, the ordinate indicates the intensity of the surface acoustic wave, and the abscissa indicates a distance with respect to the IDT.

For example, the transmitted optical signals, as obtained from the WDM optical signal by the first and third AOTFs 127-1 and 127-3, have substantially zero time fluctuations in power because the beats of the surface acoustic waves generated by the AOTFs 127-1 and 127-3 are S1 and S3, respectively, as illustrated in FIG. 4B.

Moreover, the individual combined RF signals, as inputted to the individual multiplexers 125-1 and 125-2 from the phase shifters 124-1 to 124-4, are so adjusted by the ATTs 138-1 to 138-4 as to have equal powers. As a result, the individual lights, as selectively outputted from the first to fourth AOTFs 127-1 to 127-4 by the individual RF signals, are rotated in their polarized light state of the same rotation by the individual RF signals so that their powers are substantially equalized.

Here will be described the results of simulations which were made to verify the effects of the second embodiment more specifically.

Figure 13:
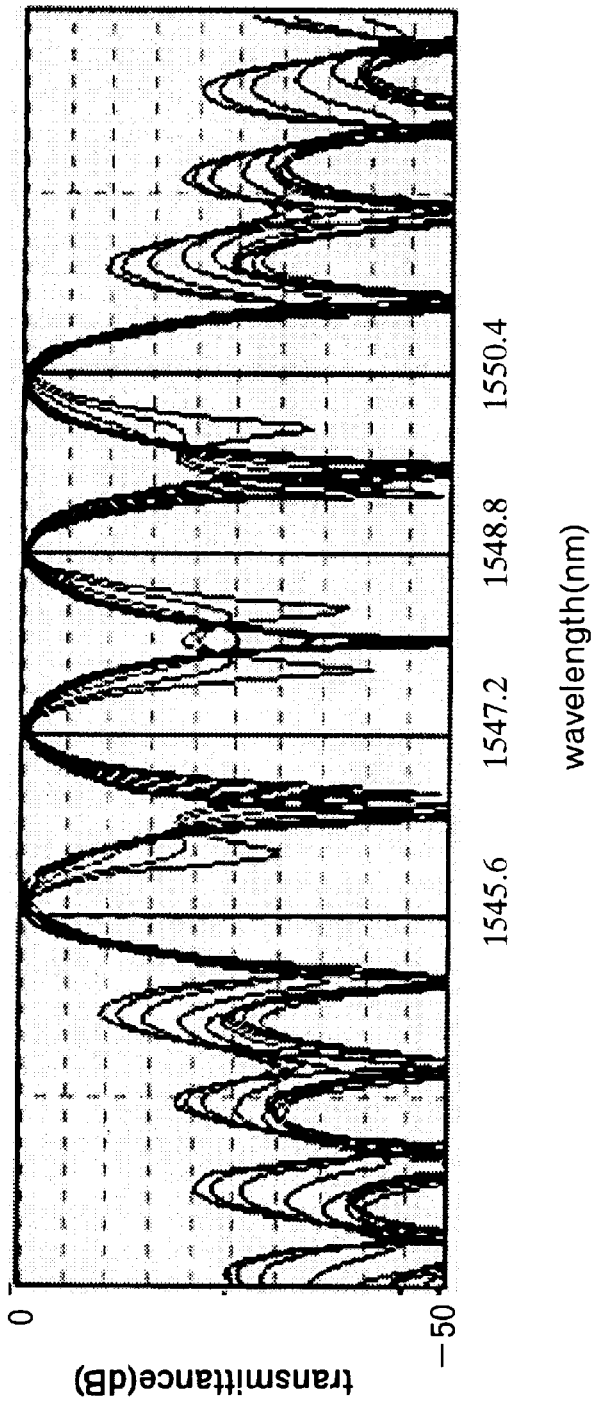
FIG. 13 is a diagram showing the simulation result of the selective characteristics of the case in which four wave lights are selected by two tandem connections AOTF.
Figure 14:
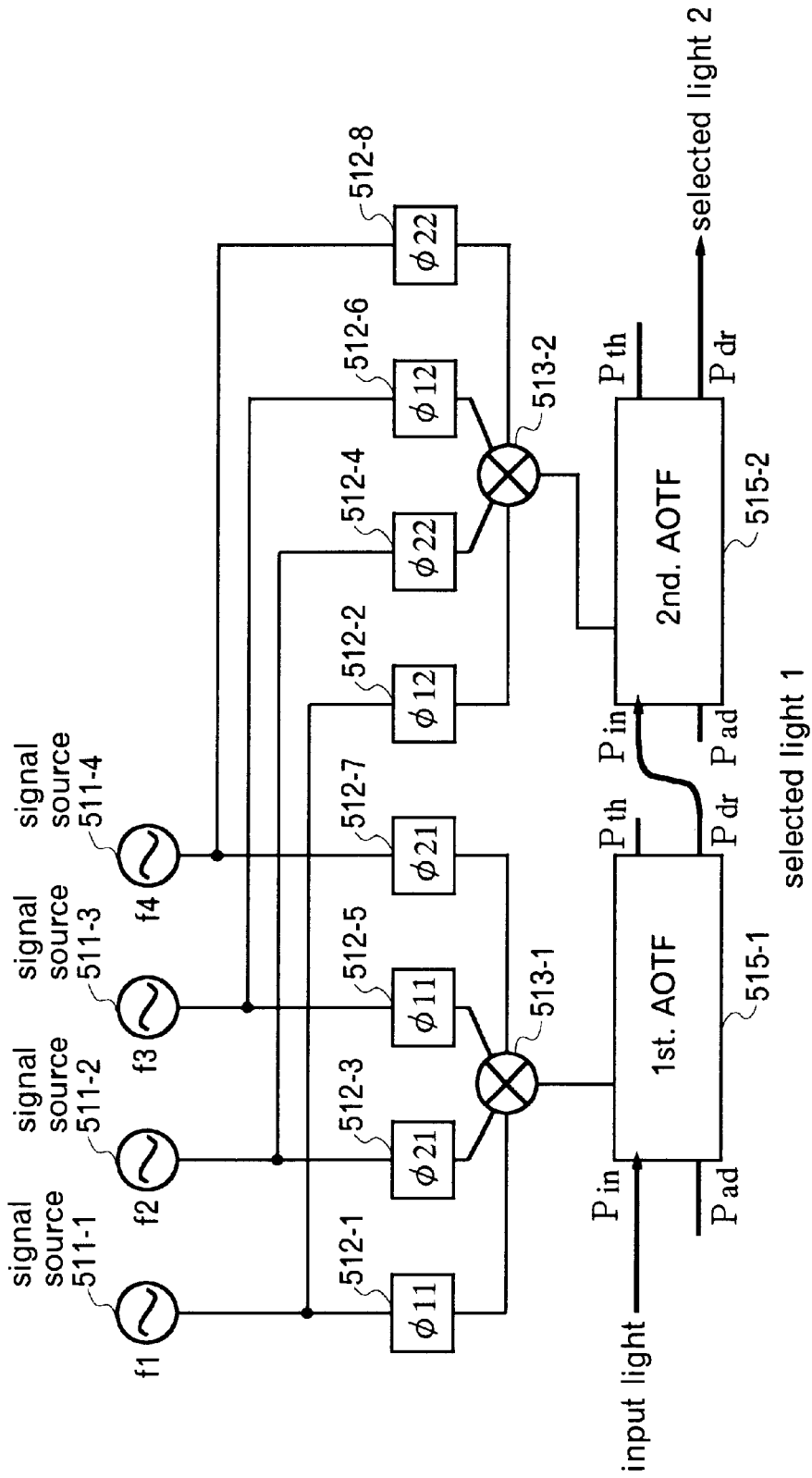
FIG. 14 is a diagram showing a construction of the AOTF to which an RF signal is applied so that the phase of the beat are made different between the AOTFS.

These simulations were performed for selecting the four waves in the second embodiment so as to make comparisons with the selecting characteristics of FIG. 13 according to the drive method of the prior art.

In the second embodiment shown in FIG. 3, more specifically, there are prepared the oscillators 121-1 to 121-4 for selecting the four waves, of which the oscillators 121-1 and 121-3 are connected as belonging to the first group with the multiplexer 122-1 and the oscillators 121-2 and 121-4 are connected as belonging to the second group with the multiplexer 122-2.

Figure 5:
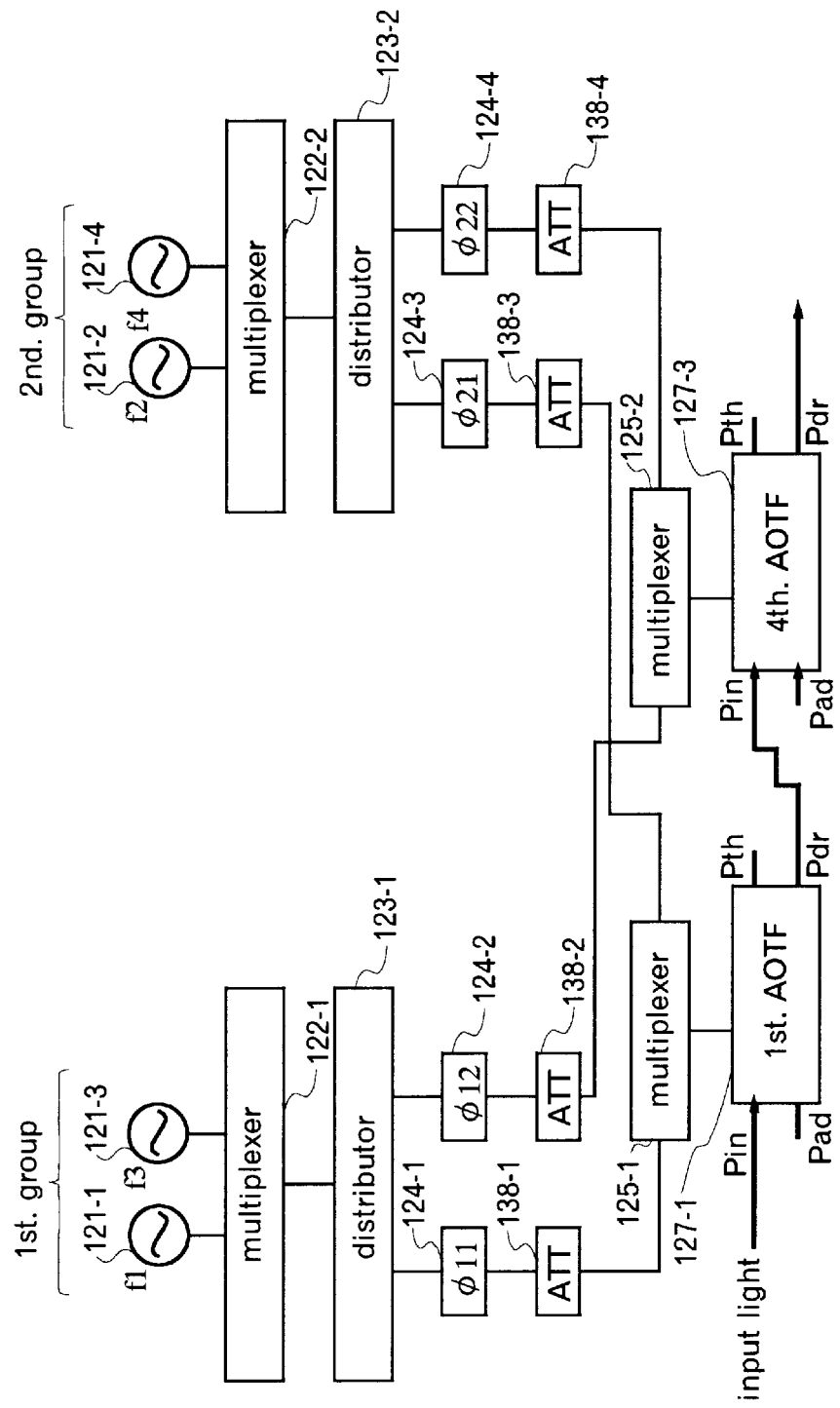
FIG. 5 is a diagram showing a construction of the case in which four waves are selected in the second embodiment (i.e., in which f1 and f3 are in a first group whereas f2 and f4 are in a second group)

FIG. 5 shows a construction of the case in which the four waves are selected in the second embodiment. Here in FIG. 5, the components having no direct relation to the simulations are omitted together with their description. In this construction for the simulations, as in the case of FIG. 13, the four waves to be selected have the wavelengths of 1545.6 nm, 1547.2 nm, 1548.8 nm and 1550.4 nm, and the working length of the AOTF is 43.1 mm.

Figure 6:
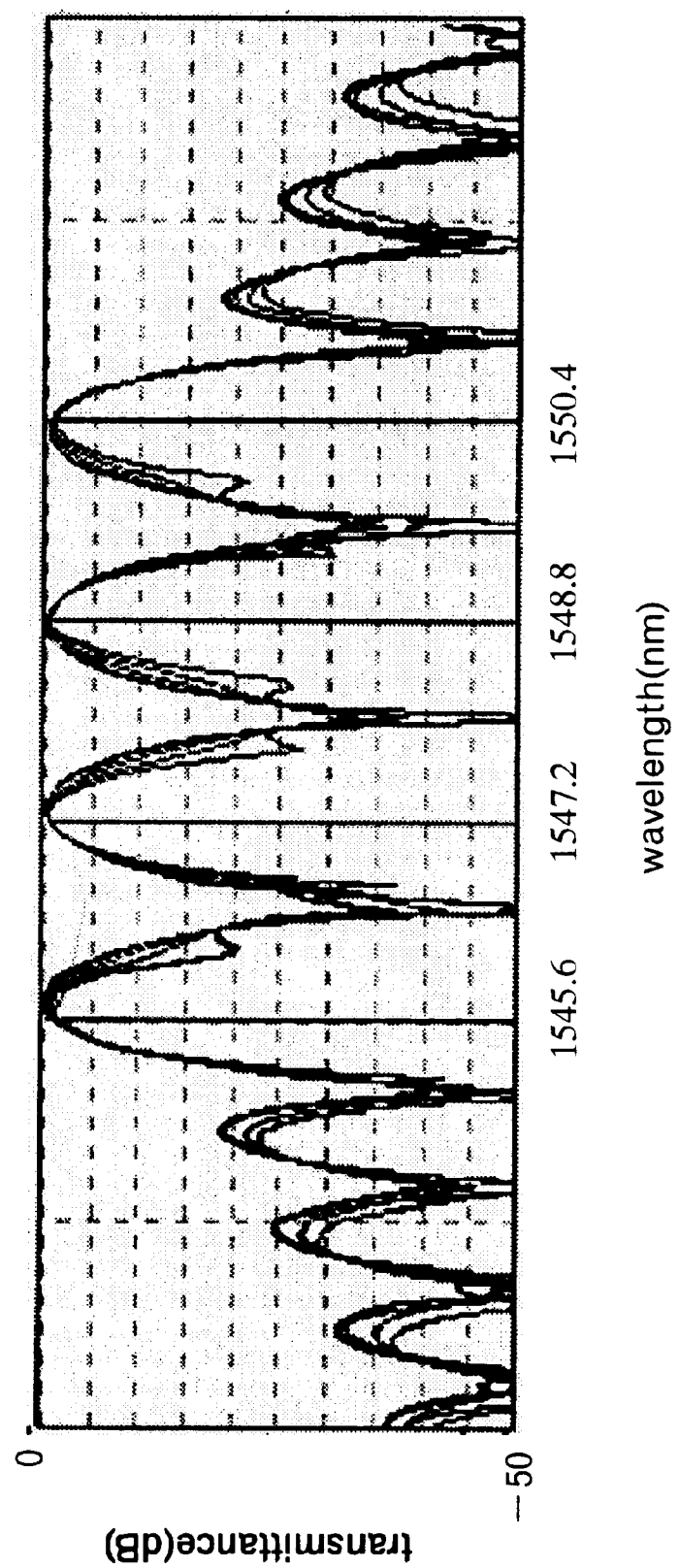
FIG. 6 is a diagram showing the simulation result of the selective characteristics in the construction shown in FIG. 5.

As illustrated in FIG. 6, the first side lobe on the shorter wavelength side than 1545.6 nm and the first side lobe on the longer wavelength side than 1550.4 nm are at about −18 dB. In this result, as compared FIG. 13, the side lobes are more suppressed than the drive method of the prior art, and the selecting characteristics are better than those of the drive method of the prior art. Here in FIG. 6, the ordinate indicates a transmittance at the unit of dB, and the abscissa indicates a wavelength at the unit of nm.

In the second embodiment, moreover, the separating is performed such that the frequencies of odd numbers are assigned to the first group whereas the frequencies of even numbers are assigned to the second group, but should not be limited thereto. For example, the separating may also be such that the oscillatory frequencies are simply separated into two at their center. When the frequencies are composed of the sixteen oscillatory ones f1 to f16 as in the second embodiment, more specifically, the frequencies f1 to f8 may be assigned to the first group whereas the frequencies f9 to f16 may be assigned to the second group.

The effects of the separating were also simulated. Like before, the simulations were performed for selecting the four waves in the second embodiment, so as to compare the selecting characteristics of FIG. 13 by the drive method of the prior art.

In the second embodiment shown in FIG. 3, more specifically, there are prepared the oscillators 121-1 to 121-4 for selecting the four waves, of which the oscillators 121-1 and 121-2 are connected as belonging to the first group to the multiplexer 122-1 whereas the oscillators 121-3 and 121-4 are connected as belonging to the second group to the multiplexer 122-2.

Figure 7:
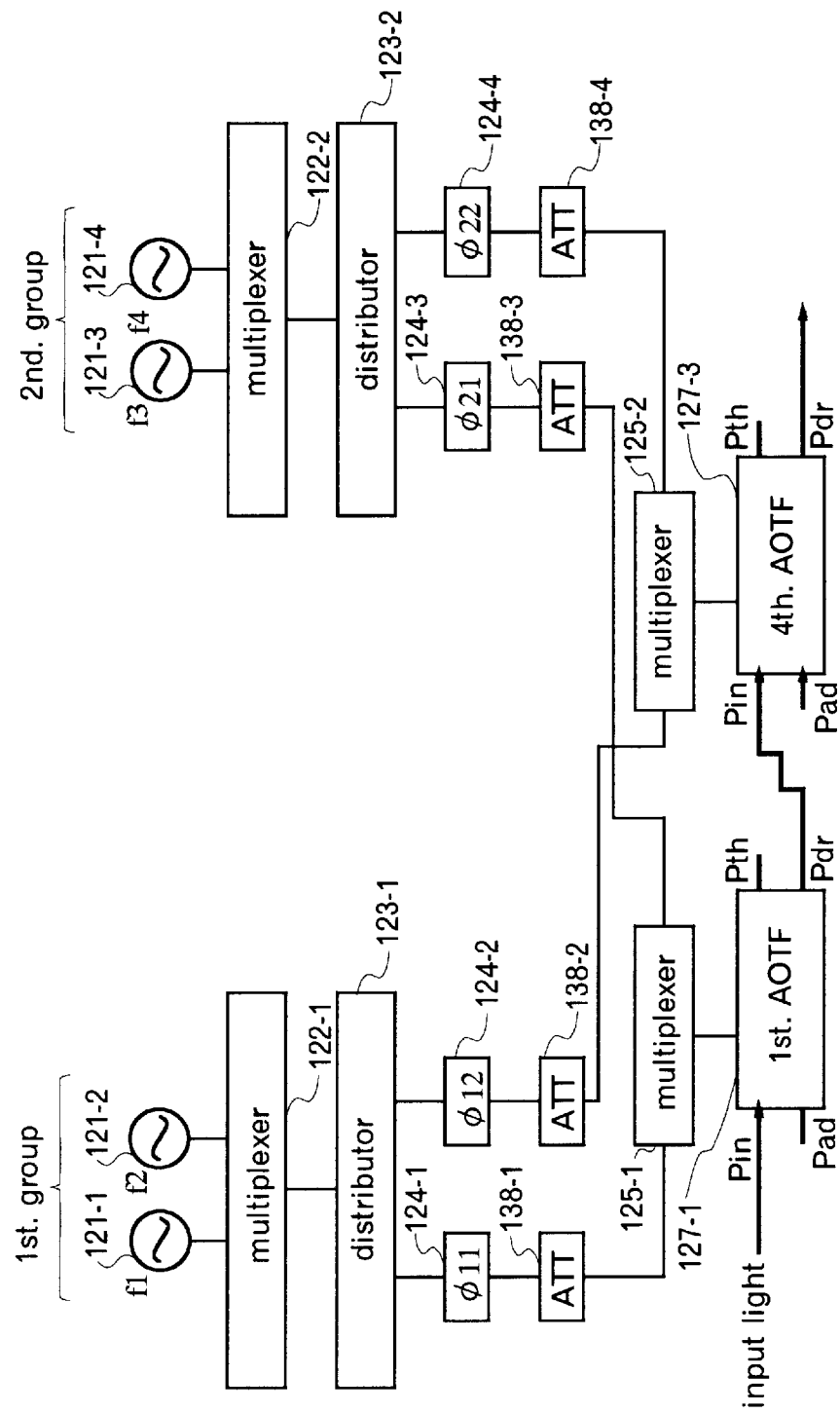
FIG. 7 is a diagram showing a construction of the case in which four waves are selected in the second embodiment (i.e., in which f1 and f2 are in a first group whereas f3 and f4 are in a second group)

FIG. 7 shows a construction of this case. Here in FIG. 7, the components having no direct relation to the simulations will be omitted together with their description.

In this construction for the simulations, too, as in the case of FIG. 13, the four waves to be selected have the wavelengths of 1545.6 nm, 1547.2 nm, 1548.8 nm and 1550.4 nm, and the working length of the AOTF is 43.1 mm.

Figure 8:
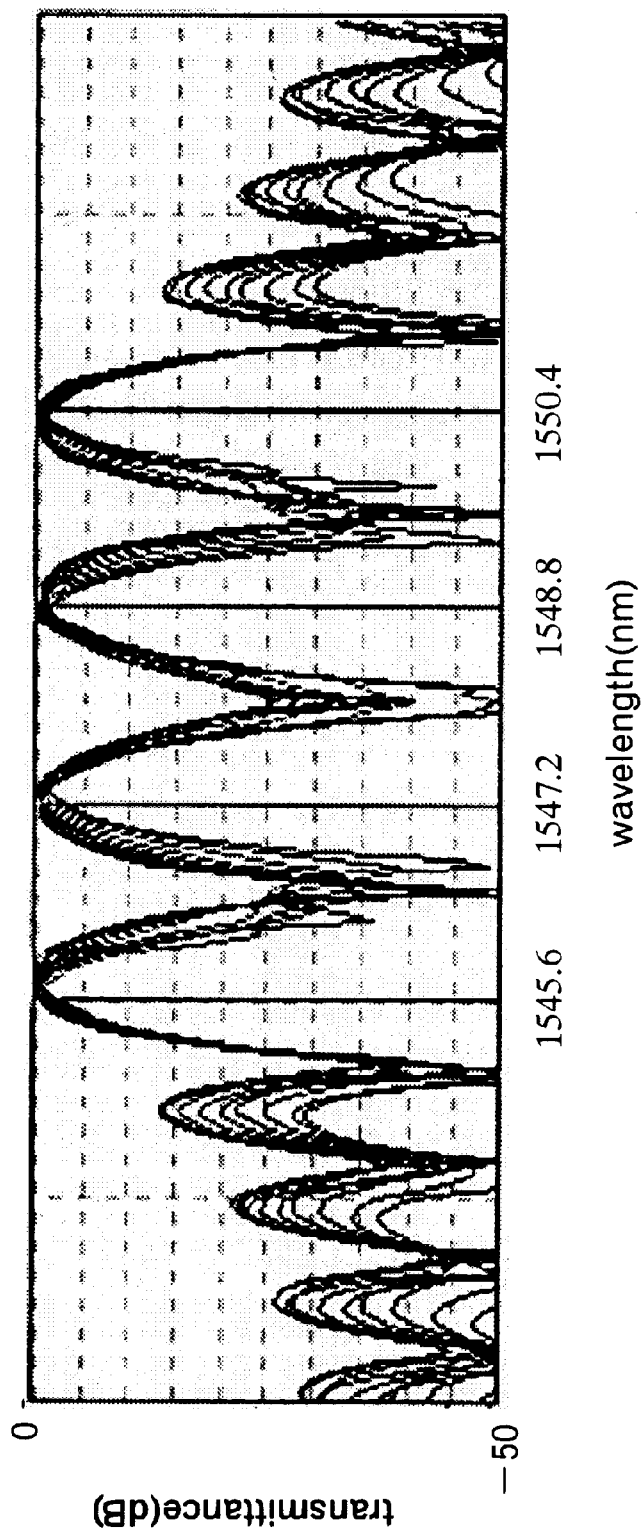
FIG. 8 is a diagram showing the simulation result of the selective characteristics in the construction shown in FIG. 7.

As illustrated in FIG. 8, the first side lobe on the shorter wavelength side than 1545.6 nm and the first side lobe on the longer wavelength side than 1550.4 nm are at about −14 dB. In this result, as compared FIG. 13, the side lobes are more suppressed than the drive method of the prior art, and the selecting characteristics are better than those of the drive method of the prior art. Here in FIG. 8, the ordinate indicates a transmittance at the unit of dB, and the abscissa indicates a wavelength at the unit of nm.

On the other hand, it is seen by comparing FIGS. 6 and 8 that the side lobe is more suppressed in FIG. 6. Specifically, the RF signals (i.e., the RF signals for selecting the adjoining channels) having adjoining frequencies are better in the selecting characteristics if they are not included in the same group. It is assumed partly because the beats becomes highest between the adjoining frequencies and partly because the beats having an integer times of 200 kHz or a space of the RF signals are generated but are eliminated each other by branching the oscillators 21 into the even and odd groups, as shown in FIG. 5.

Figure 9:
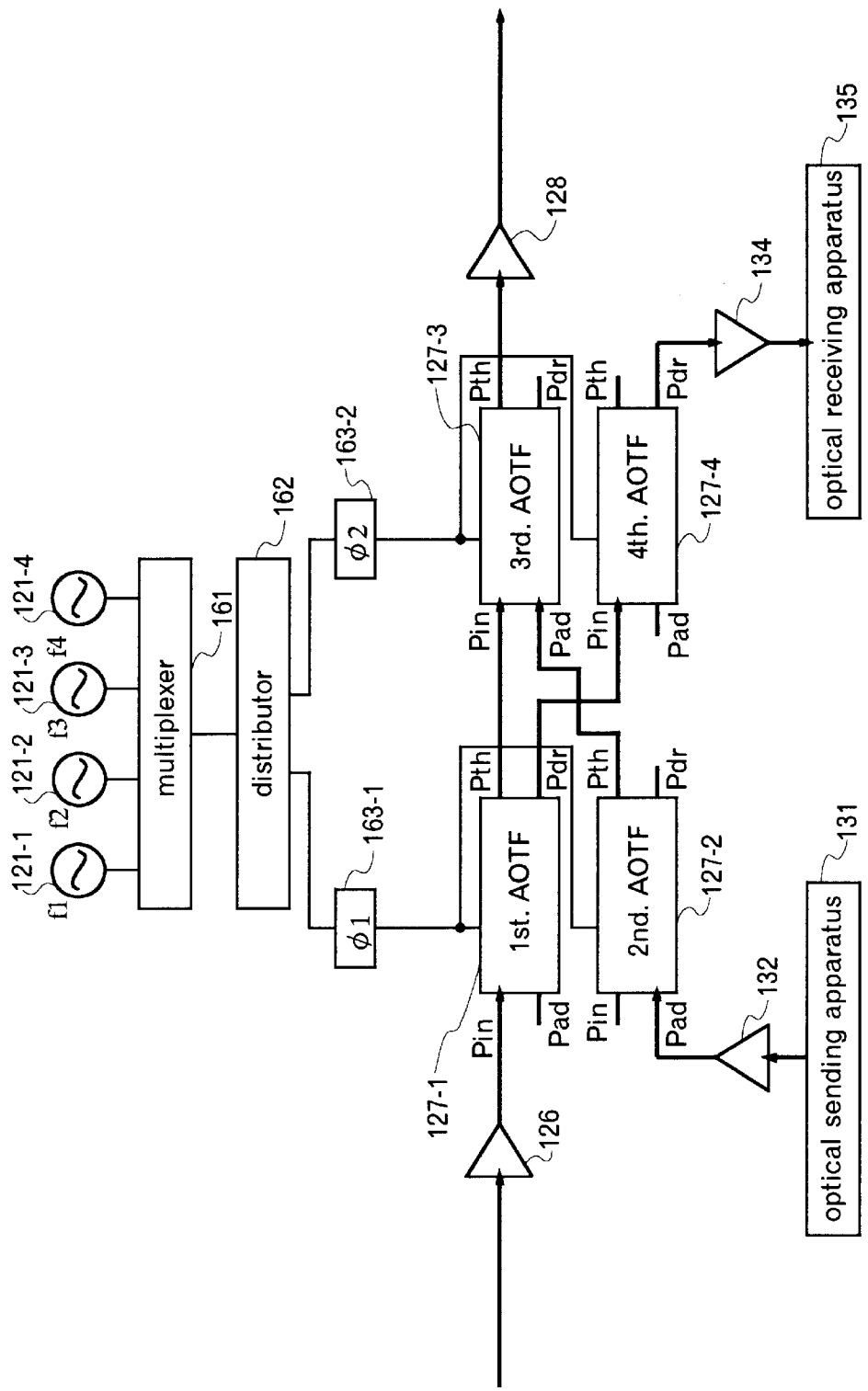
FIG. 9 is a diagram showing a construction of the case of batch-adjusting the phases.

In the invention thus far described, on the other hand, the number of phase shifters can be further reduced than that of the drive method shown in FIG. 12, but the construction shown in FIG. 9 is more simply constructed.

In FIG. 9, the RF signals, as generated by the oscillators 121-1 to 121-4, are combined by a multiplexer 161. The combined RF signals are branched by a distributor 162. Specifically, the individual RF signals branched are the RF signals having the frequencies f1 to f4. The branched RF signals on one side are adjusted to the phase Ø1 by a phase shifter 163-1 and are then supplied to the first AOTF 127-1 and the second AOTF 127-2. The branched RF signals on the other side are adjusted to the phase Ø2 by a phase shifter 163-2 and are then supplied to the third AOTF 127-3 and the fourth AOTF 127-4. The phase difference is |Ø1−Ø2|=180 degrees.

Here, the remaining components are similar to those described with reference to FIG. 3 so that their description will be omitted.

Thus in the case of the batch-adjustment of the phases, the construction could be simplified, but the phase shifters 163 will have a length of 250 m in case they are made of a coaxial cable having an impedance of 50 Ω and it is not practical.

In the constructions shown in FIGS. 5 and 7, on the other hand, the phase shifters 124 can be easily manufactured to have a length of 60 cm when they are made of a coaxial cable having the impedance of 50 Ω. Here in the calculations made above, the individual frequencies were set to f1=170 MHz, f2=170.2 MHz, f3=170.4 MHz and f4=170.6 MHz at 200 kHz spacing so that the light could be selected at wavelength spacing 1.6 nm.

Here in the second embodiment, the optical signals are dropped/added/transmitted from the WDM optical signal by connecting the AOTFs in tandem of two steps, but the AOTFs can also be connected in tandem of three or more steps. For the transmitted optical signals, the AOTFs may be connected in tandem in this case by connecting the ports Pth of the AOTFs at the front step and the ports Pin of the AOTFs at the back step. For the dropped optical signals, the AOTFs may be connected in tandem by sharing the AOTF at the first step and the one at the first step of the AOTFs connected in tandem with the transmitted optical signals and by connecting the port Pdr of the AOTF of the front step and the port Pin of the AOTF of the back step. For the added optical signals, the AOTFs may be connected in tandem by connecting the port Pth of the AOTF at the front step and the port Pad of the AOTF at the back step, and the AOTF at the final step and the one at the final step of the AOTFs connected in tandem with the transmitted optical signals may be shared.

Here will be described another embodiment.
(Construction of Third Embodiment)

This third embodiment relates to an optical communication system according to the invention.

The optical communication system of the third embodiment is modified from the optical communication system of the second embodiment such that an optical add/drop multiplexer 106 is employed in place of the optical add/drop multiplexer 104. Specifically, the optical communication system of the third embodiment is constructed to include: an optical sending apparatus 101 for generating a sixteen-WDM optical signal; an optical transmission line 102 for transmitting the WDM optical signal outputted from the optical sending apparatus 101; an optical add/drop multiplexer 106 for adding/dropping an optical signal corresponding to the channel, to/from the WDM optical signal to be transmitted on the optical transmission line 102; and an optical receiving apparatus 105 for receiving/processing the WDM optical signal transmitted. With the optical communication system, an optical repeating apparatus 103 which is interposed between the optical transmission lines 102 for compensating the transmission loss of the optical transmission lines 102. Here, the optical add/drop multiplexer 106 and the optical repeating apparatus 103 should not be limited to the case in which each of them is connected between the optical transmission lines 102, but may be provided in plurality, if necessary.

Here will be described the construction of the optical add/drop multiplexer 106.

The optical add/drop multiplexer 106 is constructed of three steps of AOTF by shifting the phase of the beat of the surface acoustic wave generated at each AOTF, by 60 degrees. This construction realizes suppression of the time fluctuations of the rejection power in the past AOTFS.

Figure 10:
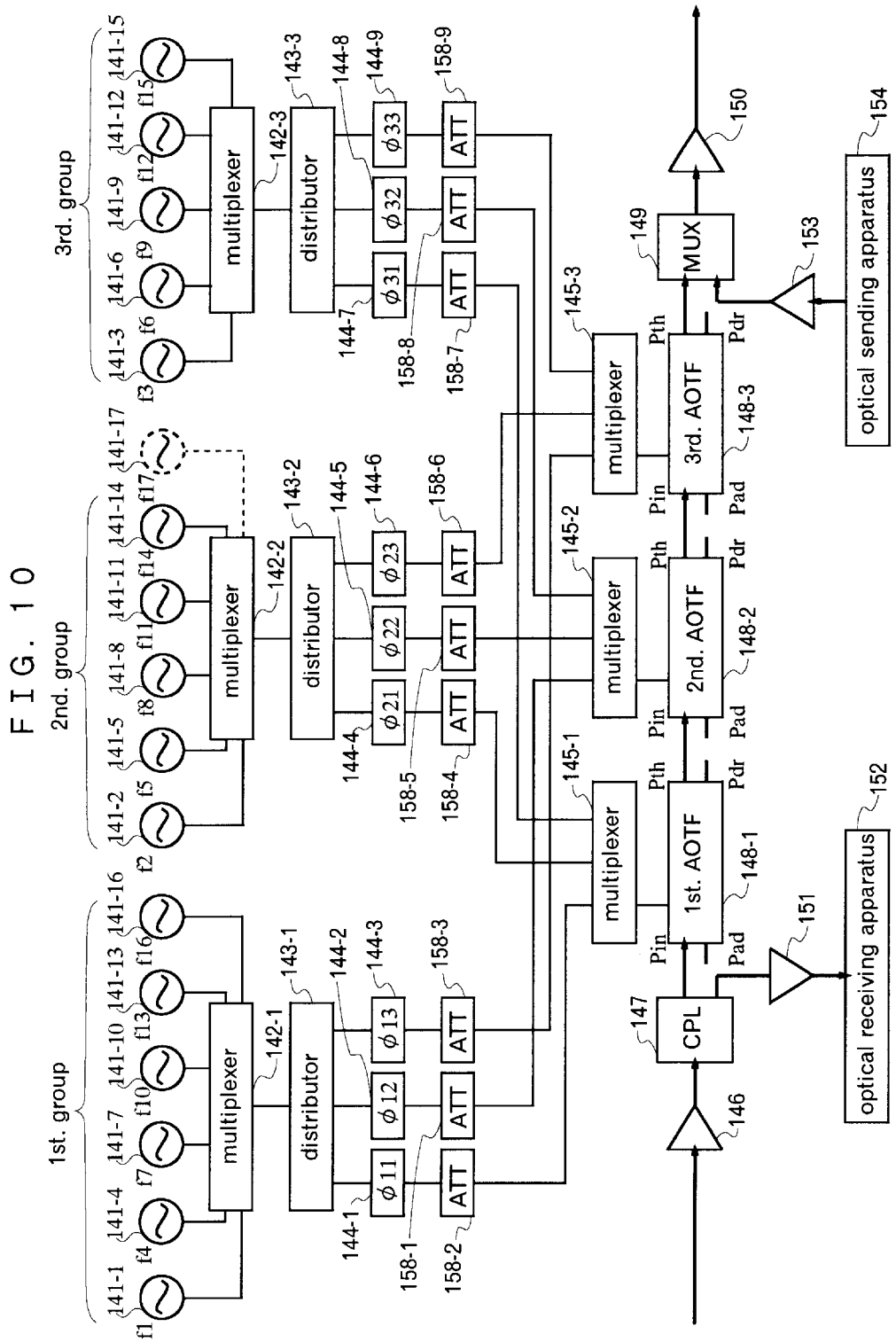
FIG. 10 is a diagram showing a construction of an optical add/drop multiplexer in the optical communication system of a third embodiment.

In FIG. 10, the RF signals for driving first to three AOTFs 148-1 to 148-3 are generated by oscillators 141-1 to 141-16 and separated into three groups because the AOTFs are connected in tandem of three steps.

The sixteen oscillators 141 are prepared in accordance with the number of channels to be dropped/added by the optical add/drop multiplexer 106. The oscillatory frequencies f1 to f16 of the individual oscillators 141-1 to 141-16 are so individually set that the polarized light states of the optical signals corresponding to the individual channels in the WDM optical signal may be rotated by the first to third AOTFs 148-1 to 148-3.

The oscillatory frequencies f1 to f16 are so separated, when they are numbered sequentially from the largest frequency f1 to the smaller ones, that the frequencies f1, f4, f7, f10, f13, and f16 having the numbers, which have the remainder 1 when they are divided by the step number 3 of the AOTFS, may belong to the first group, that the frequencies f2, f5, f8, f11, and f14 having the numbers, which have the remainder 2 when they are divided by 3 of the AOTFS, may belong to the second group, and that the frequencies f3, f6, f9, f12, and f15 having the numbers, which have the remainder 0 when they are divided by the step number 3 of the AOTFs, may belong to the third group.

Figure 11:
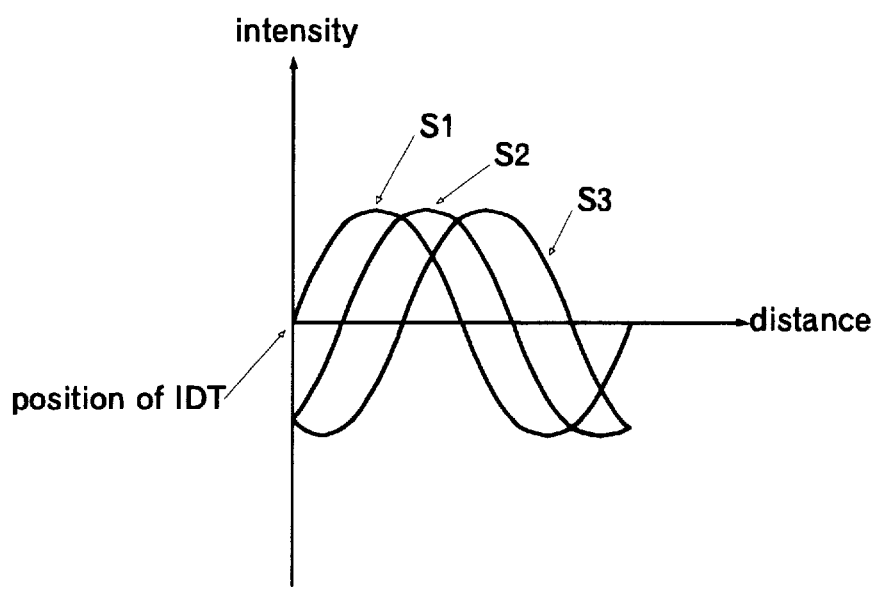
FIG. 11A is a diagram tabulating the phase Ø of each phase shifter in the third embodiment.
FIG. 11B is a diagram illustrating an intensity distribution of a beat in a surface acoustic wave for a time period in each AOTF of the third embodiment.

The individual RF signals of the frequencies belonging to the first group are inputted to a multiplexer 142-1 for combining them. The combined RF signal is inputted to a distributor 143-1. This distributor 143-1 branches the combined RF signal into three. Therefore, the individual combined RF signals thus branched contain an identical frequency component. The first combined RF signals branched are inputted to a phase shifter 144-1 for adjusting the phase of the input signal to Ø11. The second combined RF signals branched are inputted to a phase shift 144-2 for adjusting the phase of the input signal to Ø12. The third combined RF signals branched are inputted to a phase shift 144-3 for adjusting the phase of the input signal to Ø13. As shown in FIG. 11A, these phase shifters 144-1 to 144-3 adjust the phases of the individual combined RF signals to Ø12–Ø11=0 degrees and Ø13–Ø11=0 degrees.

The combined RF signal outputted from the phase shifter 144-1, is adjusted in power by an ATT 158-1 and inputted to a multiplexer 145-1. The combined RF signal outputted from the phase shifter 144-2, is adjusted in power by an ATT 158-2 and inputted to a multiplexer 145-2. Moreover, the combined RF signal outputted from the phase shifter 144-3, is adjusted in power by an ATT 158-3 and inputted to a multiplexer 145-3.

On the other hand, the individual RF signals of the frequencies belonging to the second group are inputted to a multiplexer 142-2, and the combined RF signal is inputted to a distributor 143-2. The distributor 143-2 branches the combined RF signal into three. The first combined RF signals branched are inputted to a phase shifter 144-4 for adjusting the phase of the input signal to Ø21. The second combined RF signals branched are inputted to a phase shift 144-5 for adjusting the phase of the input signal to Ø22. Moreover, the third combined RF signals branched are inputted to a phase shift 144-6 for adjusting the phase of the input signal to Ø23. As shown in FIG. 11A, these phase shifters 144-4 and 144-6 adjust the phases of the individual combined RF signals to Ø22–Ø21=120 degrees and Ø23–Ø21=240 degrees (or –120 degrees).

The individual combined RF signals outputted from the individual phase shifters 144-4 to 144-6, are adjusted in power by individual ATTs 158-4 to 158-6 and are inputted to the individual multiplexers 145-1 to 145-3.

On the other hand, the individual RF signals of the frequencies belonging to the third group are inputted to a multiplexer 142-3, and the combined RF signal is inputted to a distributor 143-3. This distributor 143-3 branches the combined RF signal into three. The first combined RF signals branched are inputted to a phase shifter 144-7 for adjusting the phase of the input signal to Ø31. The second combined RF signals branched are inputted to a phase shift 144-8 for adjusting the phase of the input signal to Ø32. Moreover, the third combined RF signals branched are inputted to a phase shift 144-9 for adjusting the phase of the input signal to Ø33. As shown in FIG. 11A, these phase shifters 144-7 and 144-9 adjust the phases of the individual combined RF signals to Ø32–Ø31=240 degrees (or –120 degrees) and Ø33–Ø31=120 degrees.

The individual combined RF signals outputted from the individual phase shifters 144-7 to 144-9, are adjusted in power by individual ATTs 158-7 to 158-9 and are inputted to the individual multiplexers 145-1 to 145-3.

The attenuations of the ATTs 158-1 to 158-9 are so set that the combined RF signal powers outputted from the individual ATTs 158-1 to 158-9 may be equal to one another.

Here, it is set according to the optical signal to be dropped/added by the optical add/drop multiplexer 106 which one of the individual RF signals of the frequencies belonging to each of the individual groups is to be inputted to the multiplexers 142-1 to 142-3. The ON/OFF of the RF signals to be inputted to the multiplexers 142-1 and 142-3 can be realized either by turning ON/OFF the individual oscillators 141-1 to 141-16 or by connecting switches between the individual oscillators 141-1 to 141-16 and the multiplexers 142-1 and 142-3 to turn ON/OFF the switches.

The multiplexer 145-1 combines the individual combined RF signals inputted. The combined RF signals are applied to the IDT in the first AOTF 148-1 to generate the surface acoustic waves in the first AOTF 148-1. The multiplexer 145-2 combines the individual combined RF signals inputted. The combined RF signals are applied to the IDT in the second AOTF 148-2 to generate the surface acoustic waves in the second AOTF 148-2. And, the multiplexer 145-3 combines the individual combined RF signals inputted. The combined RF signals are applied to the IDT in the third AOTF 148-3 to generate the surface acoustic waves in the third AOTF 148-3.

The first AOTF to the third AOTF are similar to the AOTFs shown in FIG. 12, and the description of their construction will be omitted.

On the other hand, the WDM optical signal transmitted from the optical repeating apparatus 103 or the optical add/drop multiplexer 106 through the optical transmission line 102, is inputted to an optical amplifier 146 in the optical add/drop multiplexer 106. The optical amplifier 146 is a preamplifier for compensating the transmission loss, which has occurred on the optical transmission line 102.

The WDM optical signal amplified by the optical amplifier 146, is inputted to an optical coupler (CPL) for branching the input light into two.

The one of the branched WDM optical signals is inputted to a port Pin of the first AOTF 148-1. Of the WDM optical signal inputted, only the optical signal corresponding to the frequency contained in the combined RF signals of the first to third groups from the multiplexer 145-1 is rotated in the polarized light state and is outputted to the port Pdr, and the remaining optical signals are outputted to a port Pth.

The other of the branched WDM optical signals is amplified by an optical amplifier 151 or a preamplifier and is then inputted to an optical receiving apparatus 152. The optical receiving apparatus 152 is constructed, for example, to include a DEMUX and an OR provided for each channel. The WDM optical signal is divided in wavelength for each channel by the DEMUX, and each wavelength-divided channel is received/processed by the OR corresponding to the channel. Here, only an OR corresponding to the channel to be branched by the optical add/drop multiplexer 106 operates.

On the other hand, the optical signal from the port Pth of the first AOTF 148-1 is inputted to the port Pin of the second AOTF 148-2. Of the WDM optical signals inputted, only the optical signal corresponding to the frequency contained in the combined RF signals of the first to third groups from the multiplexer 145-2 is rotated in its polarized light state and is outputted to the port Pdr, whereas the remaining optical signals are outputted to the port Pth.

The optical signal from the port Pth of the second AOTF 148-2 is inputted to the port Pin of the third AOTF 148-3. Of the optical signals inputted, only on the optical signal corresponding to the frequency contained in the combined RF signals of the first and second groups from the multiplexer 145-3 is rotated in the polarized light state and is outputted to the port Pdr, whereas the remaining optical signals are outputted to the port Pth.

At this time, the RF signal belonging to the second group, as applied to the second AOTF 148-2 by the multiplexer 145-2, has a phase which is shifted by 120 degrees from the phase of the RF signal belonging to the first group, as applied to the first AOTF 148-1. Moreover, the RF signal belonging to the third group, as applied to the third AOTF 148-3 by the multiplexer 145-3, has the phase which is shifted by 240 degrees (or −120 degrees) from the phase of the RF signal belonging to the first group, as applied to the first AOTF 148-1.

Even if the outputs in a sufficiently rejected state and in a sufficiently unrejected state with respect to the optical signals, as rotated in the polarized light state by the beat of the surface acoustic wave generated in the first AOTF 148-1 and outputted from the port Pdr so that they are rejected from the WDM optical signal, are outputted from the port Pth of the first AOTF 148-1 and inputted to the port Pin of the second AOTF 148-2, therefore, the rejection timing shifts at the second AOTF 148-2 so that the WDM optical signal, from which the optical signal to be outputted to the port Pdr of the first AOTF 148-1 is rejected, are outputted from the port Pth of the second AOTF 148-2. Moreover, the optical signal, as not rejected by the second AOTF 148-2, is more deviated in the rejection timing for the third AOTF 148-3. From the optical signal outputted from the port Pth of the third AOTF 148-3, there is sufficiently rejected the optical signal to be outputted to the port Pdr of the first AOTF 148-1.

For the optical signal to be outputted to the port Pdr of the first AOTF 148-1, therefore, there is obtained an attenuation (or rejection level) which is substantially constant with time. In the transmitted optical signals transmitted through the first to third AOTFs 148-1 to 148-3, therefore, there is obtained the optical signal, of which the optical signal to be rejected is rejected from the WDM optical signal.

The WDM optical signal, from which a predetermined channel from the port Pth of the third AOTF 148-3 is rejected, is inputted to a MUX 149.

On the other hand, the added optical signal to be added in the optical add/drop multiplexer 106 is generated in an optical sending apparatus 154 and is inputted through an optical amplifier 153 to the MUX 149. The optical sending apparatus 154 is constructed to include an OS and a MUX for each channel, for example. The optical signal to be added is generated in the OS and wavelength-multiplexed in the MUX and is outputted as an added optical signal from the optical sending apparatus 154.

The MUX 149 wavelength-multiplexes the WDM optical signal from the port Pth of the third AOTF 148-3 and the added optical signal from the optical amplifier 153. Thus, the channel to be dropped/added is rejected at the first to third AOTF 148-1 to 148-3 from the WDM optical signal to be transmitted through the main optical transmission line so that the added optical signal is added to the "vacant" channel.

The WDM optical signal from the MUX 149 is amplified by an optical amplifier 150 or a host amplifier and is sent to the optical transmission line 102.

(Operations/Effects of Third Embodiment)

So as to suppress the fluctuations in the power of the light selectively outputted from the AOTF due to application of the RF signals having different frequencies to one AOTF, each RF signal is branched into three to be individually applied to the AOTFs connected in tandem of three steps, to adjust the individual phases of the branched RF signals.

In the AOTFs connected in tandem of three steps in the third embodiment, the individual RF signals are grouped into signals having common phases to be branched/adjusted. Specifically, the individual RF signals are branched into: a first group of the RF signals having a phase difference of Ø12−Ø11=0 degrees and Ø13−Ø11=0 degrees; a second group of the RF signals having a phase difference of Ø22−Ø21=120 degrees and Ø23−Ø21=240 degrees; and a third group of the RF signals having a phase difference of Ø32−Ø31=240 degrees and Ø33−Ø31=120 degrees.

Moreover, the RF signals belonging to the first group are combined into one and batch-adjusted in the phase shifters 144-1 to 144-3 to have a phase of Ø12−Ø11=0 degrees and Ø13−Ø11=0 degrees. The RF signals belonging to the second group are combined into one and batch-adjusted in the phase shifters 144-4 to 144-6 to have a phase of Ø22−Ø21=120 degrees and Ø23−Ø21=240 degrees. The RF signals belonging to the third group are combined into one and batch-adjusted in the phase shifters 144-7 to 144-9 to have a phase of Ø32−Ø31=240 degrees and Ø33−Ø31=120 degrees.

As a result, the number of phase shifters can be further reduced than that of the case in which the phases are adjusted after each RF signal was branched into three. More specifically, 16×3=48 phase shifters are necessary when they are provided individually for the RF signals, whereas 3×3=9 phase shifters are sufficient in the case of the third embodiment.

Moreover, the individual RF signals to be applied to the first to third AOTFs 148-1 to 148-3 are identical between the case when the phase shifters are provided individually for the RF signals and the case of the third embodiment. In the surface acoustic waves, therefore, the beat S2 is so generated in the AOTF 148-2 of the intermediate step and the beat S3 is so generated in the AOTF 148-3 of the back step, as to eliminate the beat S1 of the AOTF 148-1 of the front step, as illustrated in FIG. 11B. As a result, power of optical signals to be rejected from the transmitted optical signals in the first to third AOTFs 148-1 to 148-3 are suppressed in time fluctuation. That is, in the rejection level, time fluctuation of the power is suppressed. Here, the phase difference between the beats S1 and S2 is at 60 degrees, and the phase difference between the beats S1 and S3 is at 120 degrees.

In FIG. 11B, the ordinate indicates the intensity of the surface acoustic wave, and the abscissa indicates the distance with reference to the IDT.

Moreover, the individual combined RF signals, as inputted to the individual multiplexers 145-1 to 145-3 from the phase shifters 144-1 to 144-9, are so adjusted by the ATTs 158-1 to 158-9 as to have equal powers. As a result, the individual lights, as rejected at the first to third AOTFs 148-1 to 148-3 by the individual RF signals, are rotated in their polarized light state of the same rotation by the individual RF signals so that their rejection levels are substantially equalized.

Here in the third embodiment, the optical signals of the channels are rejected from the WDM optical signal by connecting the AOTFs in tandem of three steps, but the AOTFs can also be connected in tandem of four or more steps. In this modification, the AOTFs may be connected in tandem by connecting the ports Pth of the AOTFs at the front step and the ports Pin of the AOTFs at the back step.

On the other hand, a rejectable wavelength is newly extended, if intended so, to the AOTFS 148-1 to 148-3 which are connected in tandem of three steps for rejecting those sixteen waves, as follows.

The wavelength to be newly extended is set on the longer wavelength side than that assigned to a channel 16. A frequency f17 of the RF signal for rejecting the wavelength to be newly extended is smaller than the frequency 16 of the RF signal for rejecting the channel 16, so that the number 17 is assigned to the frequency f17. The remainder resulting from dividing the number 17 by the step number 3 of the AOTF is 2. Hence, the frequency f17 belongs to the second group.

Therefore, an oscillator 141-17 for rejecting the newly extended wavelength is connected, as indicated by a broken line in FIG. 10, with the multiplexer 142-2 for combining the RF signals which are outputted from the individual oscillators 141 belonging to the second group.

When a channel 18 is to be extended to the longer wavelength side than that of the wavelength assigned to an extended channel 17, a number 18 is assigned to a frequency f18 of the RF signal for rejecting the channel 18 so that the frequency f18 belongs to the third group. Therefore, an oscillator 141-18 for oscillating the frequency f18 is connected with the multiplexer 142-3.

When the newly extended wavelength is set to the shorter wavelength side than that of the wavelength assigned to the channel 1, on the other hand, a frequency f0 of the RF signal for rejecting the newly extended wavelength is higher than the frequency f1 of the RF signal for rejecting the channel 1 so that the number 0 is assigned to the frequency f0. The remainder resulting from dividing the number 0 by the step number of the AOTF is 0. Hence, the frequency f0 belongs to the third group.

In this case, therefore, an oscillator 141-0 for rejecting the newly extended wavelength is connected with the multiplexer 142-3.

Thus, the oscillator 141 for oscillating the RF signal for the newly extended wavelength is extended so that the phase shifters 144 need not be extended.

Figure 15:
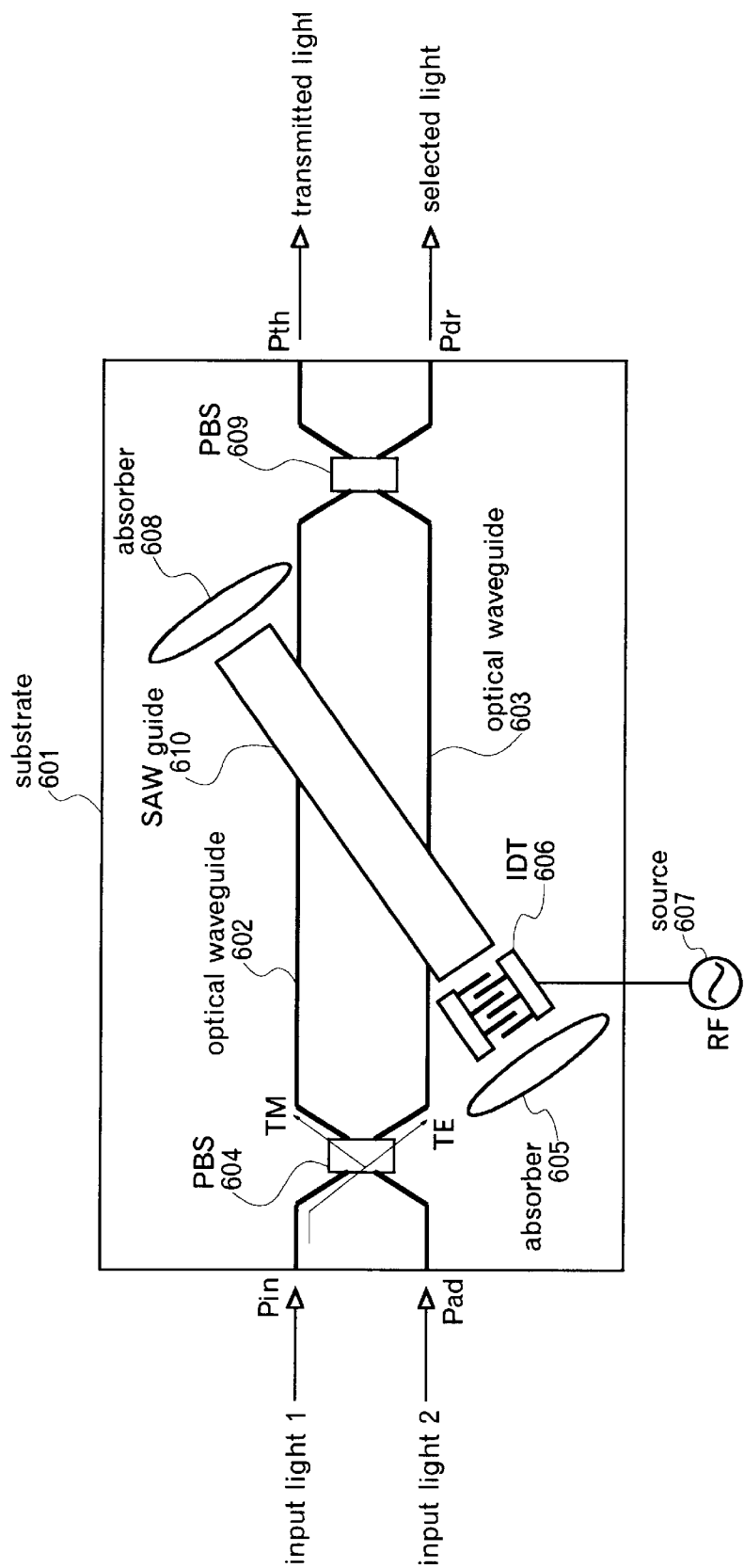
FIG. 15 is a diagram showing a construction of another example of the AOTF.

Here, the second and third embodiments have been described on the case in which the AOTF is exemplified by those shown in FIG. 12, but the invention should not be limited thereto. For example, the invention can be applied to the AOTF shown in FIG. 15. The invention can also be applied to the AOTF for selectively outputting light at a wavelength corresponding to the RF signal which is applied for inducing the acousto-optic effects. This is because a plurality of RF signals for selectively outputting a plurality of lights are applied to that AOTF to generate a beat in the AOTF.

In the separating in the second embodiment, moreover, the frequencies are separated by numbering them sequentially from the largest frequency f1 to the smaller ones. By numbering the frequencies sequentially from the smallest one f16 to the larger ones, however, the frequencies of odd numbers f1, f3, - - - , f13 and f15 may be separated to be included in the first group whereas the frequencies of even numbers f2, f4, - - - , f14 and f16 may be separated to be included in the second group. In this case, the number of frequencies is an even number of sixteen so that the frequencies belong to the individual groups are reserved, but no different results in the operations and effects. The separating in the third embodiment may also be reversed to number the frequencies sequentially from the smallest one f16.

In the second and third embodiments, on the other hand, the optical signals are added to all the "vacant" channels by dropping/rejecting the channels at the AOTFs 127 and 148 from the WDM optical signal to be transmitted on the main optical transmission line, but the invention should not be limited thereto. The optical signals may be added to portions of the "vacant" channels. In the aforementioned example, the first to sixth channels are "vacant", but the optical signals may be added to portions of the first to sixth channels, e.g., to the second and fourth channels. Alternatively, the optical signals may be added to the fourth to sixth channels. These combinations are arbitrary within the range of the "vacant" channels.

In the second and third embodiments, moreover, the AOTFs 127 and 148 may be connected, if intended so, in tandem through the optical amplifier such as the optical fiber amplifier so as to compensate the loss which occurs in the AOTFs 127 and 148 at the front step. For example, the optical amplifier is interposed between the port Pth of the first AOTF 127-1 and the port Pin of the third AOTF 127-3. The optical amplifier is interposed between the port Pth of the first AOTF 148-1 and the port Pin of the second AOTF 148-2.

On the other hand, the second and third embodiments have been described on the case of the WDM optical signal of sixteen waves, but the invention should not be limited thereto. The invention can be applied to the WDM optical signal in which an arbitrary number of optical signals are wavelength-multiplexed. Here, the numbers of the phase shifters 124 and 144 depend on the step number of the AOTFs connected in tandem so that they do not increase even if the number of the optical signals to be wavelength-multiplexed increases. The larger the number of the optical signals to be wavelength-multiplexed is, therefore, the further the number of phase shifters can be reduced, compared to the phase shifters according to the AOTF drive method of the prior art.

In the second embodiment, moreover, the added optical signals are inputted to the port Pad of the third AOTF 127-3 through the second AOTF 127-2 for suppressing the time-fluctuations due to the beats. However, the added optical signals may be inputted to the port Pad of the third AOTF 127-3 directly not through the second AOTF 127-2.

The invention is not limited to the above embodiments and various modifications may be made without departing from the spirit and the scope of the invention. Any improvement may be made in part or all of the components.

What is claimed is:

1. A drive method for a plurality of acousto-optic filters connected in tandem for selectively outputting light at a wavelength corresponding to an RF signal, comprising the steps of:

separating a plurality of RF signals of different frequencies into a plurality of groups;

generating a plurality of combined RF signals by combining said plurality of RF signals in each of said groups;

branching each of said combined RF signals so to be supplied to each of said plurality of acousto-optic filters; and making phases of beats of said plurality of RF signals generated in said plurality of acousto-optic filter different.

2. The drive method for a plurality of acousto-optic filters according to claim 1, wherein individual phase differences between said combined RF signals branched are adjusted so that phase differences of beats between said plurality of acousto-optic filters have a value which is obtained by dividing 180 degrees by the number of steps of said plurality of acousto-optic filters.

3. The drive method for a plurality of acousto-optic filters according to claim 1, wherein said separating is performed by numbering said plurality of RF signals in order of frequencies and then separating said RF signals into groups according to remainders which result from dividing the numbers of said RF signals by the number of steps of said plurality of acousto-optic filters.

4. An acousto-optic filter apparatus comprising:
- a plurality of acousto-optic filters connected in tandem for selectively outputting light at a wavelength corresponding to an RF signal;
- a plurality of signal generating means for generating RF signals;
- combining means for generating a plurality of combined RF signals by separating a plurality of RF signals of different frequencies generated by said signal generating means into a plurality of groups, and then combining the RF signals in each of said groups;
- branching means for branching said combined RF signals so to be supplied to each of said plurality of acousto-optic filters; and
- a plurality of phase adjusting means for adjusting phases of said combined RF signals branched by said branching means so that phases of beats of said plurality of RF signals generated in said plurality of acousto-optic filters are made different.

5. The acousto-optic filter apparatus according to claim 4, wherein said phase adjusting means adjusts phases so that phase differences of beats between said plurality of acousto-optic filters have a value which is obtained by dividing 180 degrees by the number of steps of said plurality of acousto-optic filters.

6. The acousto-optic filter apparatus according to claim 4, wherein the separating in said combining means is performed by numbering said plurality of RF signals in order of frequencies and then separating said RF signals into groups according to remainders which result from dividing the numbers of said RF signals said by the number of steps of said plurality of acousto-optic filters.

7. The acousto-optic filter apparatus according to claim 4, further comprising:
- a plurality of adjusting means for adjusting output power of said phase adjusting means; and
- collecting means for collecting from said groups and combining individual outputs of said plurality of adjusting means so as to supply the outputs to said each acousto-optic filter.

8. A selective wavelength extension method for extending the number of wavelengths to be selected by said acousto-optic filter apparatus according to claim 4,
- wherein an RF signal corresponding to a selected wavelength to be extended is to be included in any of said groups so as to maintain a phase of a beat occurring in an acousto-optic filter.

9. The selective wavelength extension method for extending the number of wavelengths to be selected by said acousto-optic filter apparatus according to claim 4, comprising the steps of:
- extending the number of wavelengths to a number one smaller than the minimum of numbers which are given to said plurality of RF signals in order of frequencies; and
- including in any of said groups an RF signal corresponding to said wavelength to be extended in accordance with remainders which result from dividing said number one smaller than said minimum number by the number of steps of said plurality of acousto-optic filters.

10. An optical add/drop multiplexer for adding/dropping optical signals to/from a wavelength-division multiplexing optical signal to be transmitted on an optical transmission line, comprising:
- an acousto-optic filter apparatus comprising:
  - a plurality of acousto-optic filters connected in tandem for selectively outputting light at a wavelength corresponding to an RF signal;
  - a plurality of signal generating means for generating RF signals;
  - combining means for generating a plurality of combined RF signals by separating a plurality of RF signals of different frequencies generated by said signal generating means into a plurality of groups, and then combining the RF signals in each of said groups;
  - branching means for branching said combined RF signals so to be supplied to each of said plurality of acousto-optic filters; and
  - a plurality of phase adjusting means for adjusting phases of said combined RF signals branched by said branching means so that phases of beats of said plurality of RF signals generated in said plurality of acousto-optic filters are made different,
  - optical receiving means for receiving/processing an optical signal to be dropped in said acousto-optic filter apparatus; and
  - optical sending means for generating an optical signal to be added in said acousto-optic filter apparatus.

11. An optical communication system comprising: an optical sending apparatus for generating a wavelength-division multiplexing optical signal for wavelength-multiplexing a plurality of optical signals; an optical transmission line for transmitting a wavelength-division multiplexing optical signal from the optical sending apparatus; and an optical receiving apparatus for receiving/processing a wavelength-division multiplexing optical signal from the optical transmission line,
- wherein an optical add/drop multiplexer according to claim 10 for adding/dropping an optical signal to/from said wavelength-division multiplexing optical signal transmitted on said optical transmission line is compromised.

12. The optical add/drop multiplexer for adding/dropping an optical signal to/from a wavelength-division multiplexing optical signal to be transmitted on an optical transmission line, comprising:
- optical branching means for branching said wavelength-division multiplexing optical signal into two;
- optical receiving means for receiving/processing an optical signal to be dropped, from one of the branched wavelength-division multiplexing optical signals by said optical branching means;
- an acousto-optic filter apparatus for eliminating an optical signal to be dropped, from the other of the branched wavelength-division multiplexing optical signals by said optical branching means;
- optical sending means for generating an optical signal to be added; and
- optical multiplexing means for wavelength-multiplexing a wavelength-division multiplexing optical signal outputted from said acousto-optic filter apparatus and an optical signal outputted from said optical sending means, and
- wherein said acousto-optic filter apparatus comprises:
  - a plurality of acousto-optic filters connected in tandem for selectively outputting light at a wavelength corresponding to an RF signal;

a plurality of signal generating means for generating RF signals;

combining means for generating a plurality of combined RF signals by separating a plurality of RF signals of difference frequencies generated by said signal generating means into a plurality of groups and then combining the RF signals in each of said groups;

branching means for branching said combined RF signals so to be supplied to each of said plurality of acousto-optic filters;

a plurality of phase adjusting means for adjusting phases of said combined RF signals branched by said branching means so that phases of beats of said plurality of RF signals generated in said plurality of acousto-optic filters are made different.

13. An optical communication system comprising: an optical sending apparatus for generating a wavelength-division multiplexing optical signal for wavelength-multiplexing a plurality of optical signals; an optical transmission line for transmitting a wavelength-division multiplexing optical signal from the optical sending apparatus; and an optical receiving/processing a wavelength-division multiplexing optical signal from the optical transmission line, wherein an optical add/drop multiplexer according to claim 12 for adding/dropping an optical signal to/from said wavelength-division multiplexing optical signal transmitted on said optical transmission line is comprised 14. The selective wavelength extension method for extending the number of wavelengths to be selected by said acousto-optic filter apparatus according to claim 4, comprising the steps of:

extending the number of wavelengths to a number one greater than the maximum of numbers which are given to said plurality of RF signals in order of frequencies; and including in any of said groups an RF signal corresponding to said wavelength to be extended in accordance with remainders which result from dividing said number one greater than said maximum number by the number of steps of said plurality of acousto-optic filters.

* * * * *

UNITED STATES PATENT AND TRADEMARK OFFICE
CERTIFICATE OF CORRECTION

PATENT NO. : 6,728,487 B2
DATED : April 27, 2004
INVENTOR(S) : Tadao Nakazawa

It is certified that error appears in the above-identified patent and that said Letters Patent is hereby corrected as shown below:

Title page,
Item [57], ABSTRACT,
Line 5, change "AOTFS" to -- AOTFs --.

Column 24,
Lines 40-41, change "compromised" to -- comprised --.

Column 25,
Line 23, after "optical" insert -- receiving apparatus for --.

Signed and Sealed this

Twenty-fourth Day of August, 2004

JON W. DUDAS
*Director of the United States Patent and Trademark Office*